US012643284B2

(12) United States Patent
Dudley et al.

(10) Patent No.: US 12,643,284 B2
(45) Date of Patent: Jun. 2, 2026

(54) 3D PRINTING USING ROTATIONAL COMPONENTS AND IMPROVED LIGHT SOURCES

(71) Applicant: Orange Maker, LLC, Glenside, PA (US)

(72) Inventors: Kurt Dudley, Westlake Village, CA (US); James Tersigni, Holmes, NY (US)

(73) Assignee: Orange Maker, LLC, Glendale, PA (US)

( * ) Notice: Subject to any disclaimer, the term of this patent is extended or adjusted under 35 U.S.C. 154(b) by 1083 days.

(21) Appl. No.: 17/476,319

(22) Filed: Sep. 15, 2021

(65) Prior Publication Data

US 2022/0001598 A1     Jan. 6, 2022

Related U.S. Application Data

(60) Continuation of application No. 15/877,314, filed on Jan. 22, 2018, now Pat. No. 11,141,908, which is a
(Continued)

(51) Int. Cl.
*B29C 64/20*          (2017.01)
*B29C 64/112*         (2017.01)
(Continued)

(52) U.S. Cl.
CPC ............ *B29C 64/112* (2017.08); *B29C 64/20* (2017.08); *B29C 64/268* (2017.08); *B29C 64/40* (2017.08);
(Continued)

(58) Field of Classification Search
CPC ....... B29C 64/40; B29C 64/268; B29C 64/20; B29C 64/112; B33Y 10/00; B33Y 30/00; B29K 2909/08
See application file for complete search history.

(56) References Cited

U.S. PATENT DOCUMENTS 4,575,330 A     3/1986  Hull
5,247,180 A     9/1993  Mitcham et al.
(Continued)

FOREIGN PATENT DOCUMENTS

WO     WO2010/120839        10/2010
WO     WO2014/165265 A1     10/2014

OTHER PUBLICATIONS

Search Report and Written Opinion of International Application No. PCT/US2018/014750, issued May 4, 2018.

*Primary Examiner* — Christina A Johnson
*Assistant Examiner* — Kelsey C Grace

(57) ABSTRACT

Methods, devices, and systems for efficient 3D printing are set forth. Some embodiments utilize a circular-shaped build area revolving symmetrically around a single center point utilizing a semi-continuous or continuous helical printing process. Polymerizable build material is fed in a controlled manner to a build region where it is irradiated to cause solidification of the build material so as to provide a polymerization gradient zone comprising liquid polymerizable material, partially cured polymerizable material and fully cured polymerized material. Polymerization inhibitors can be provided to retard polymerization in selected regions of the build. The method can also include delivery of supporting materials to aid in maintaining the 3D structure during the build process.

42 Claims, 25 Drawing Sheets

Related U.S. Application Data continuation-in-part of application No. 15/088,365, filed on Apr. 1, 2016, now Pat. No. 9,937,665, which is a division of application No. 14/207,353, filed on Mar. 12, 2014, now Pat. No. 9,321,215.

(60) Provisional application No. 62/448,905, filed on Jan. 20, 2017, provisional application No. 61/778,285, filed on Mar. 12, 2013.

(51) Int. Cl.
| | |
|---|---|
| *B29C 64/268* | (2017.01) |
| *B29C 64/40* | (2017.01) |
| *B33Y 10/00* | (2015.01) |
| *B33Y 30/00* | (2015.01) |

(52) U.S. Cl.
CPC .............. *B33Y 10/00* (2014.12); *B33Y 30/00* (2014.12); *B29K 2909/08* (2013.01)

(56) References Cited

U.S. PATENT DOCUMENTS

| | | | |
|---|---|---|---|
| 6,429,443 B1 | 8/2002 | Mankos et al. | |
| 6,482,576 B1 | 11/2002 | Farnworth et al. | |
| 7,991,498 B2 | 8/2011 | Kritchman | |
| 9,604,412 B2 | 3/2017 | Donaldson et al. | |
| 9,751,259 B2 | 9/2017 | Donaldson et al. | |
| 10,589,512 B2 | 3/2020 | DeSimone et al. | |
| 10,639,841 B2 | 5/2020 | Donaldson et al. | |
| 2004/0046860 A1 | 3/2004 | Beier et al. | |
| 2004/0265413 A1 | 12/2004 | Russell et al. | |
| 2006/0104328 A1 | 5/2006 | Crews | |
| 2012/0195994 A1* | 8/2012 | El-Siblani | B29C 64/357 |
| | | | 15/320 |
| 2013/0287933 A1 | 10/2013 | Kaiser et al. | |
| 2014/0265032 A1* | 9/2014 | Teicher | B29C 64/112 |
| | | | 264/401 |
| 2014/0265034 A1* | 9/2014 | Dudley | B33Y 30/00 |
| | | | 264/401 |
| 2015/0102531 A1 | 4/2015 | El Siblani et al. | |
| 2017/0014910 A1 | 1/2017 | Ng et al. | |
| 2019/0084239 A1 | 3/2019 | Carlson et al. | |
| 2019/0160749 A1 | 5/2019 | Hellestam | |
| 2020/0016655 A1 | 1/2020 | Crump et al. | |
| 2020/0055239 A1 | 2/2020 | Nixon et al. | |

* cited by examiner

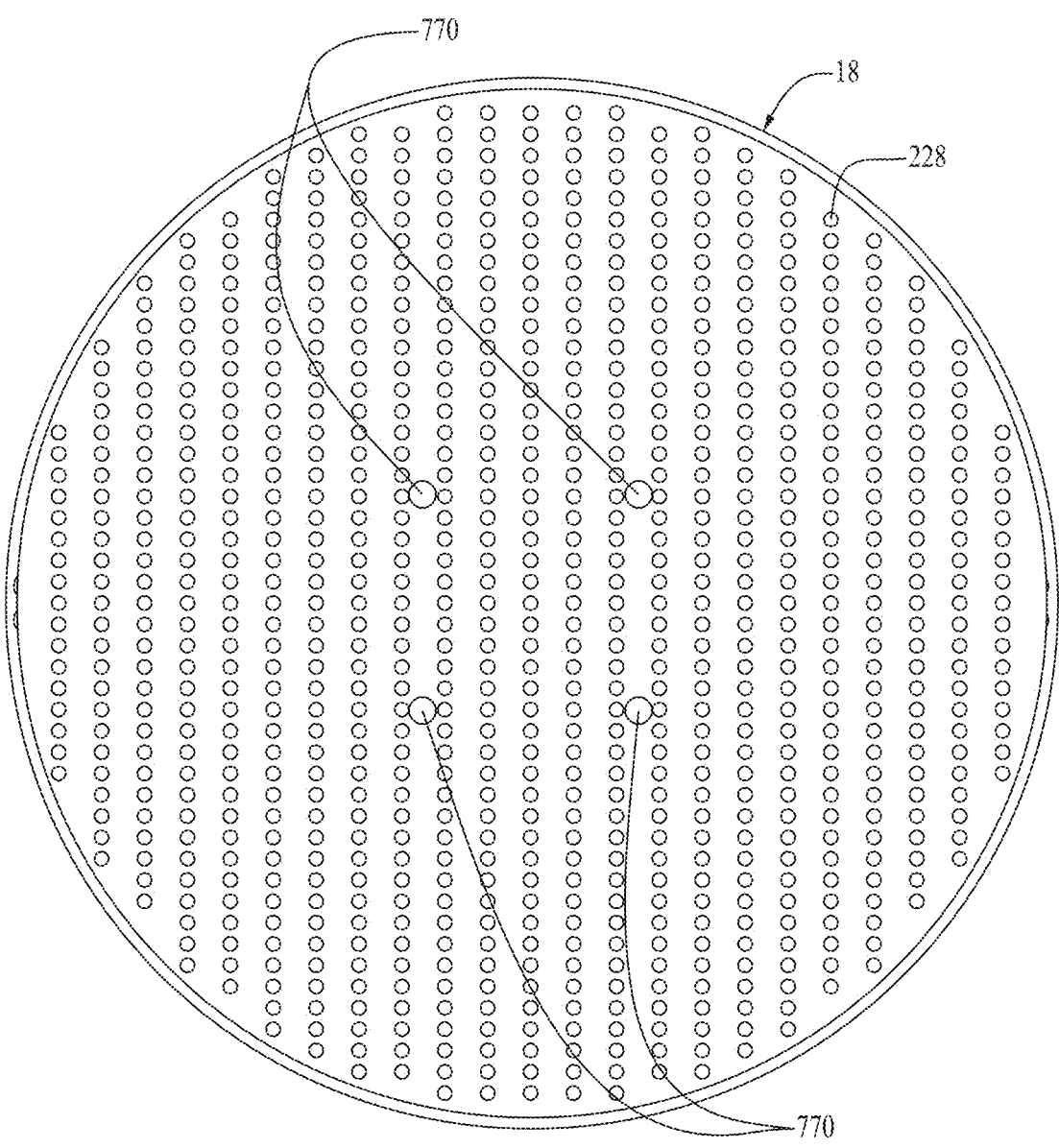
_Fig. 8_

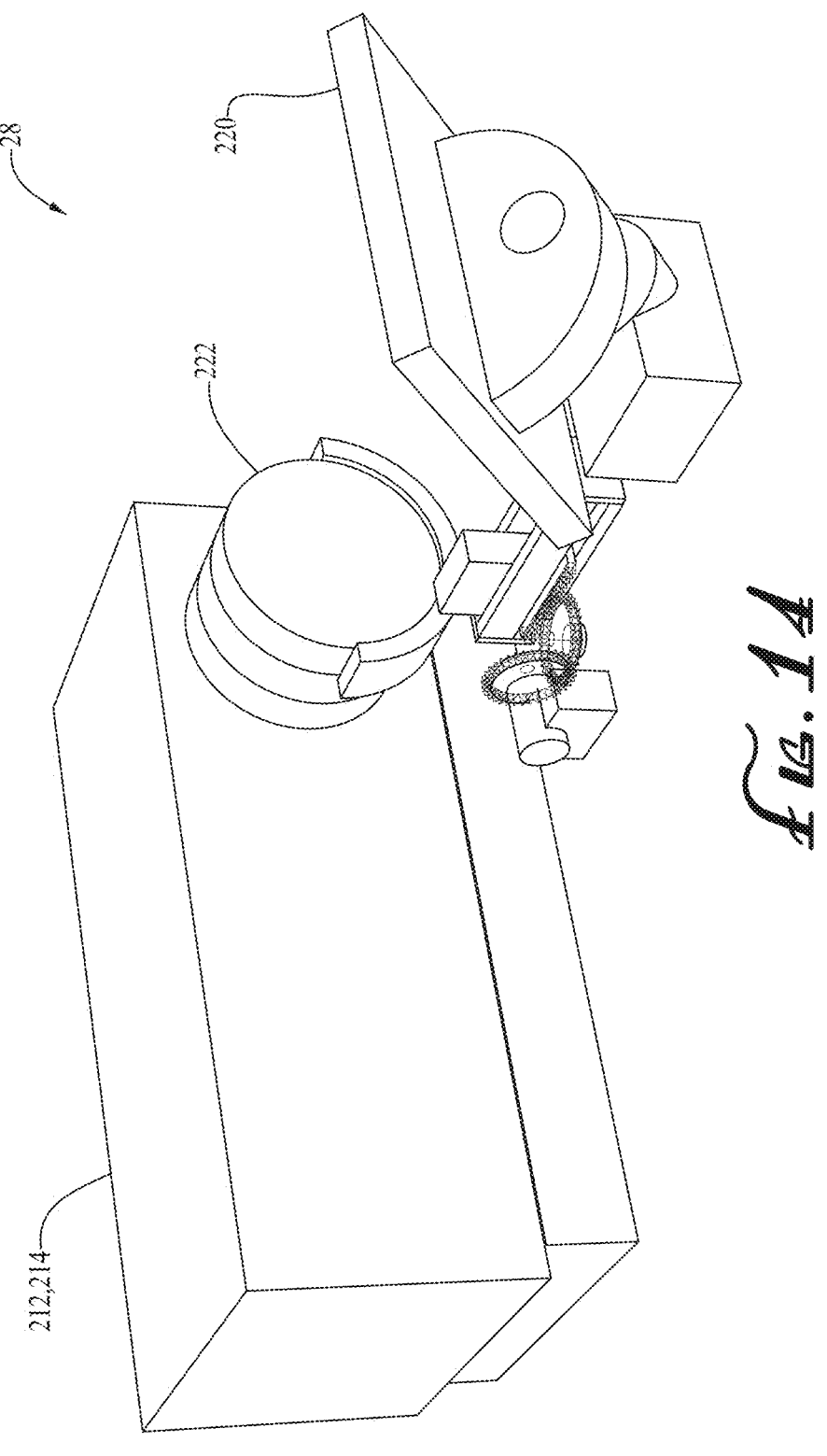
_Fig. 14_

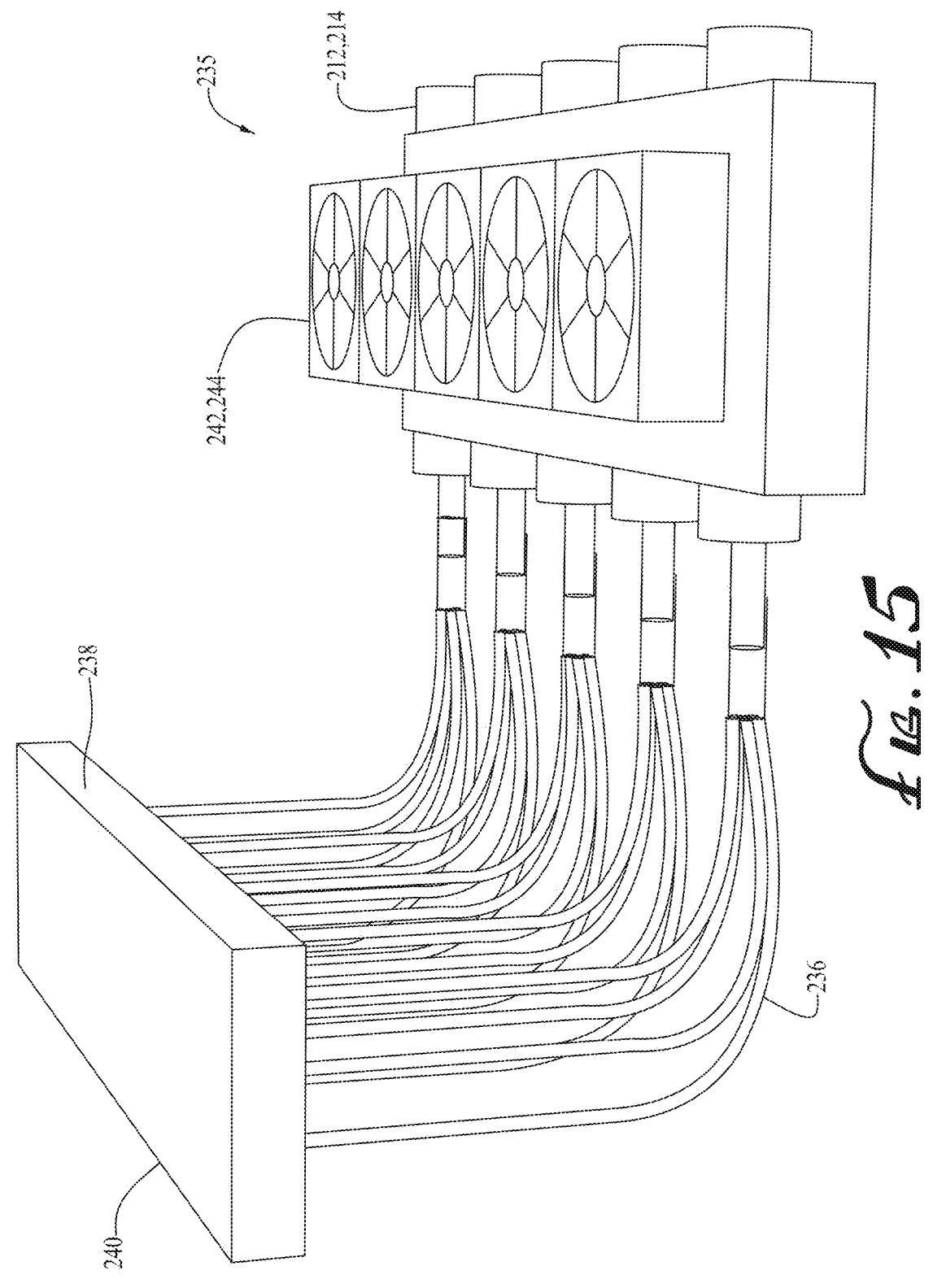
_Fig. 15_

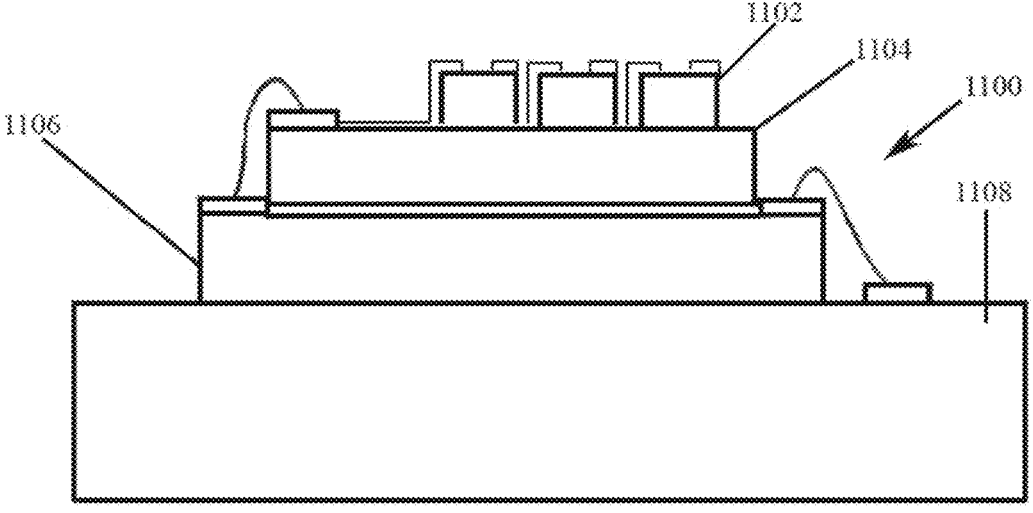
*Fig.24ₐ*
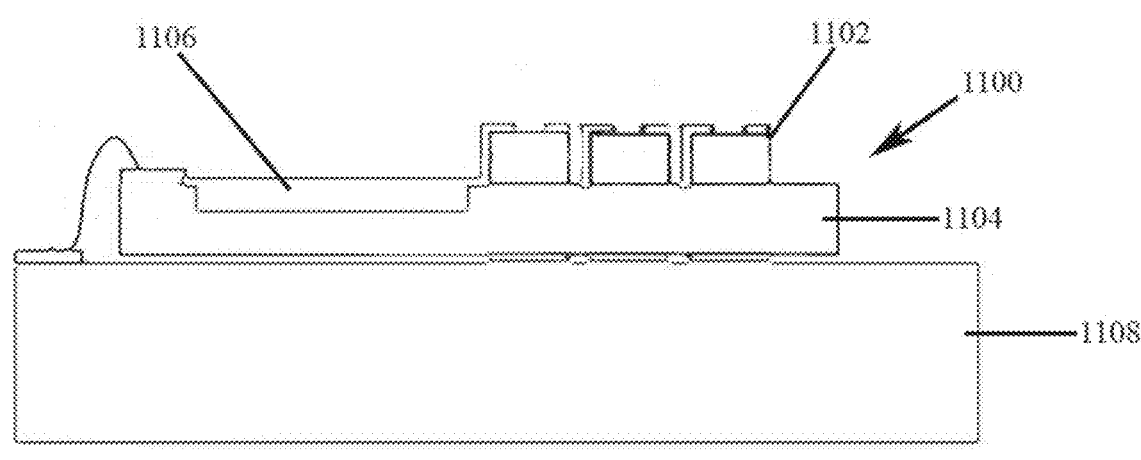
*Fig.24ᵦ*

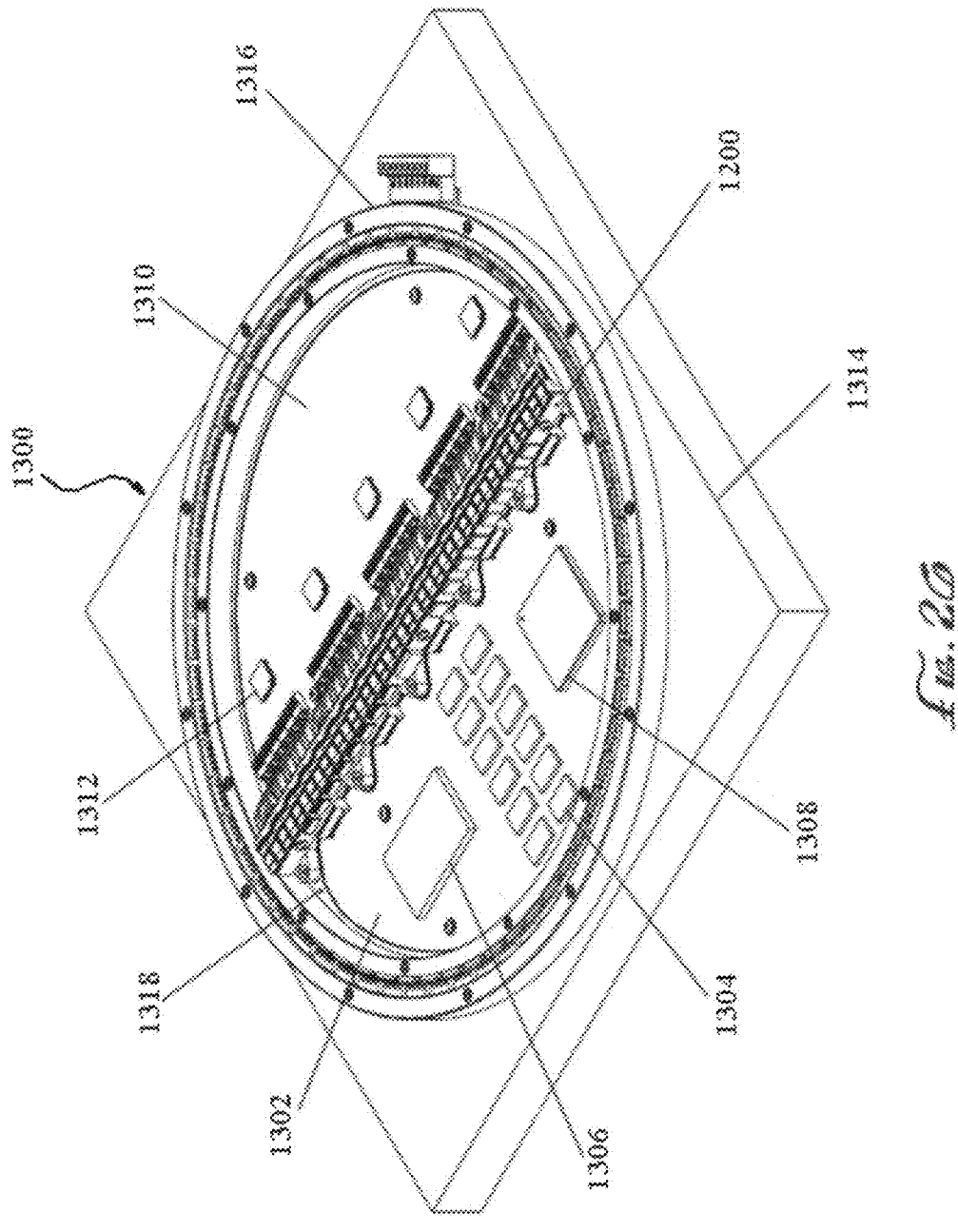
_FIG. 26_

3D PRINTING USING ROTATIONAL COMPONENTS AND IMPROVED LIGHT SOURCES

CROSS REFERENCE TO RELATED APPLICATIONS

This application is a Continuation of U.S. patent application Ser. No. 15/877,314 filed Jan. 22, 2018, which claims priority from US Provisional Application Ser. No. 62/448,905 filed Jan. 20, 2017 which is also a continuation-in-part of U.S. Ser. No. 15/088,365, filed Apr. 1, 2016, now U.S. Pat. No. 9,937,665, which is a divisional of U.S. patent application Ser. No. 14/207,353, filed Mar. 12, 2014, now U.S. Pat. No. 9,321,215, which claims the benefit of U.S. Provisional Application Ser. No. 61/778,285, filed on Mar. 12, 2013. Each of these applications are hereby incorporated herein in their entirety by reference.

BACKGROUND OF THE INVENTION

Field of the Invention

Described herein are methods, procedures and devices for forming three-dimensional (3D) objects from a wide variety of media, such as a polymeric, biological or metallic materials. The methods, procedures and devices are programmed to produce desired three dimensional (3D) structures using polymerization, crosslinking, curing, sintering, melting or solidification and similar techniques in a manner constituting improvements over conventional stereolithographic, photocurable, or other 3D object forming techniques.

Description of the Related Art

In recent years, 3D printing has been demonstrated to be an effective technique for accurately forming 3D objects, such as for the purpose of prototyping and manufacture. In its most general sense, 3D printing typically utilizes a 3D scanner and/or computer software to generate an image map of a desired object. That image map is then translated into a grid-like structure such that a fabrication device can deposit a flowable material, such as a plastic, polymer, biomaterial or resin, via an additive process, which is simultaneously solidified creating a 3D object. Various existing 3D printing methodologies which provide unique advantages and also each have their own disadvantages.

One such methodology is stereolithography, credited as being developed by Charles W. Hull and set forth, for example, in U.S. Pat. No. 4,575,330. Stereolithography aims to create three-dimensional objects based on the successive linear formation of layers of a fluid-like medium adjacent to previously formed layers of medium and the selective solidification of those layers according to cross-sectional data representing successive slices of the desired three-dimensional object in order to form solid layers. Stereolithography technology uses a liquid medium that is typically a melted thermoplastic or a photopolymer which is selectively solidified. The thermoplastic solidifies by exposure to a lower temperature; the photopolymer is solidified by exposing it to radiation usually in the UV or visible wavelengths causing the polymer to crosslink or cure. Typical methods for directing this radiation onto photocurable materials include motor controlled scanning mirrors, mask systems or lasers wherein the smallest physical resolution is the size of the laser beam or, within the mask, the size of a pixel.

Stereolithography-based machines solidifying photopolymer-based resins typically utilize a singular, focused laser point which is scanned in the X-Y plane using a physical gantry system or is otherwise directed by electromechanically-driven highly reflective surfaces such as galvanometers or rotating polygon mirrors. Because of this, print speed is inversely proportional to both layer density and layer volume.

A method of using the "singular point" type of stereolithography to solidify photopolymers includes utilizing a laser and controllable mirror configuration is described in U.S. Pat. No. 4,575,330 to Hull. The process utilizes incrementally submerging a build-platform in a vat of photocurable material, wherein a layer of material that covers the build platform is solidified via targeted radiation from a laser using two controllable mirrors which direct the radiation in a x/y plane along the surface of the material. Areas are selectively solidified corresponding to cross-sectional data represented in a cross sectional bitmap image of a slice of a virtual three-dimensional model representing an object. Lines are traced over the liquid surface to solidify the photocurable material. The process is repeated multiple times by lowering the build platform into the vat of material by an amount correlating to the next desired layer height. After new material is deposited over the construction area, the process of solidification repeats to form the individual stacked layers to form a three dimensional object.

Another method, which utilizes a "plane exposure" type stereolithography, is the use of a Digital Micromirror Device (DMD)-based variation on the stereolithography process. These variations provide significant improvements in print speed and create a constant build time independent of layer density for a given layer volume, because DMD arrays can expose and direct entire planes of focused light at once rather than a singular point which must be scanned to create a layer. A typical 720×480 DMD array can expose 345,600 individual "pockets" of solidified resin, also known as voxels, all at once in a single layer exposure. Typical layer exposure times can range from 0.2-10+ seconds, depending on a variety of factors. DMD-based processes can work very well for small print sizes, but once a critical layer area is surpassed, the suction force generated by layer-peeling mechanism will inhibit buildup of the 3D object.

There are several limitations to the above processes. For example, resolution is proportional to the focusable point size of the laser; if it is desired to increase the resolution, a smaller point size must be used. This has the consequence of increasing the total amount of lines to be traced in a given area, resulting in longer construction times. Additionally, the process of submerging a platform in a vat of material is both limiting to the functional size of the object that can be created and also requires exposure of large volumes of photocurable materials to construct the 3D object.

Furthermore, the above method of subjecting a fluid surface to radiation poses its own set of issues with regards to consistent layer heights and errors that can be caused from disturbances to the liquid surface. These disturbances can result from both internal and external sources of vibration. The layer height, and therefore the vertical resolution of the object, is also dependent on the viscosity and surface tension of the material used. This limits the vertical resolution that is attainable with a given range of materials.

Recently, an inverted sterolithographic process has been developed that introduces the additional factor of surface adhesion resulting from a newly solidified layer adhering to the bottom of a vat. This adhesion force increases as a function of the size of the solidified layer. However, before the construction process can resume, the adhesion force must be removed and the build platform raised to allow new material to be placed prior to the solidification of the next additional layers of material, for example, via use of prying, tilting, peeling and sliding.

These processes for removal of the adhesion force place the vat, the build platform, the raising element for the build platform and the newly solidified geometries of the printed object under high stress loads that can decrease the functional life of the machine and its components, as well as causing deformations and delamination of the object being constructed. A method to reduce this surface adhesion in large area solidification is described in European patent application EP 2419258 A2, where a single layer is broken into sub component images that are solidified and separated individually. This method, however, doubles the construction time and increases the chance for product failure due to delamination caused by increasing the amount of unsupported areas to be solidified.

Common areas where all rapid manufacturing systems can be improved upon comprise increasing resolution, enhancing scalability of constructible parts, increasing the ability to construct difficult geometries, such as hollow cavities and overhangs, and increasing the ability to construct and preserve small and fragile geometries, such as those having little surrounding support. Time to construct individual layers and total construction time are other important factors relating to the efficiency of the construction process of every system each of which has to its own set of unique limiting factors that dictate how long it will take to construct of a given object. Efficient methods and devices that address these conventional inefficiencies while utilizing a single compact device is therefore needed. Additionally, conventional light sources utilized in 3D printers have their own limitations and improved light sources allowing for faster cure times is also desirable.

SUMMARY

Described herein are methods, devices and systems for efficient 3D printing that address inefficiencies and deficiencies of currently existing 3D printing systems utilizing a single device. For ease of explanation and to provide an efficient nomenclature, the formation of 3D structures using the new techniques, procedures and devices set forth and incorporating features of the present invention are referred to as heliolithography. Heliolithography provides solutions to the above mentioned inherent problems associated with traditional prototyping techniques. It allows 3-dimensional solid physical products to be made directly from computer-driven data and reproduced with very high and accurate levels of detail, in a short time using a completely automated process. Certain aspects of Heliolithography are similar to stereolithography. Both Heliolithography-based and stereolithography-based processes can utilize a variety of materials as their base material, and these materials are solidified into physical parts through various solidification techniques, such as a free radical polymerization of photopolymers upon exposure to a precisely directed and focused actinic photon source of sufficient energy density. However, there are several key differences between heliolithography and stereolithography-based printing processes.

Heliolithography utilizes the best of "singular point" and "plane exposure" concepts discussed above to continuously solidify the building material, such as a photopolymer material, in thin lines by a spiral buildup. When these lines are oriented as radii in a build area, for example, in a circular-shaped build area revolving symmetrically around a single center point, then a continuous printing process can be performed in a helical fashion. The build platform (upon which solidified material is deposited to form the physical object) in one embodiment is continually rotated and simultaneously raised in a very gradual manner while the material to be solidified, such as a photopolymer is deposited as a liquid in a thin line on a transparent platform. A stationary line of focused actinic radiation delivered from a position below the platform is directed into the liquid photopolymer to produce a single continuous "layer" of the now solidified material deposited and bonded to adjacent previously or simultaneously deposited material in a helical fashion. Alternatively, heliography can also be implemented by slowly raising the build platform without rotation while a line of focused radiation "spins" beneath in a programmed manner, curing liquid photopolymer continuously. In a further embodiment, the platform can be periodically or continuously rotated and at the same time the actinic light can be periodically or continuously reposition during the buildup and curing process.

Methods and systems incorporating features of the present invention seek to solve the issue of having both simultaneously high construction resolutions while still preserving the ability to print large structural objects in a faster more economical way than can be achieved by the prior art. Such systems can utilize a continuous method for depositing and solidifying materials, for example, photocurable materials, in a rotational manner that results in a spiral build-up of material.

In some embodiments of an apparatus incorporating features of the present invention, a rotating build platform with an elevation that can be controlled along a Z-axis is utilized. This build platform is lowered onto at least one solidification area which comprises at least one material dispenser, at least one transparent substrate, for example, from which a material flows and is held against the build platform during solidification, at least one drainage system to remove unused material and at least one excess material stripper for collecting and removal and recycling of unsolidified materials. In a photopolymerization process, electromagnetic radiation emitted from a source below the transparent substrate, is directed onto the photocurable construction material in specifically targeted regions that coincide with point data derived from a three-dimensional object that is stored in the machines memory system.

In the use of photopolymers, both construction materials and irradiation sources are selected to provide a near instantaneous cure of the construction material. The solidified material adheres to the rotating build platform, resulting in the continuous or semi-continuous spiral build-up of material to construct an object substantially similar in appearance to a desired three-dimensional object. In utilizing these processes incorporating features of the present invention, vertical resolution of a constructible object can correspond to the layer height or layer pitch angle of a continuous spiral layer of material and can be controlled by altering the relative distance at which the inverted build platform is suspended above the photocurable material that is held on a transparent substrate.

In some embodiments, Vertical-cavity surface-emitting lasers (VCSELs) are utilized as highly efficient light sources. These VCSELs can be incorporated into a material dispensing component, such as a print head, and can be configured with rotational components to allow for rotation of the VCSEL arrays to customize curing. In some embodiments, thermoelectric coolers (TAC) and/or fluid-based coolers can be utilized with the VCSELs to provide cooling.

In one embodiment, a device for three-dimensional (3D) printing of structures in a vertical orientation can comprise a construction area and a material dispenser with a flowable build material in the material dispenser. The material dispenser can be positioned to deliver the flowable material onto an exposure zone of an upper surface of the construction area. The device can also comprise one or more vertical-cavity surface-emitting laser (VCSEL) chips on or adjacent the material dispenser, the VCSEL chips positioned to deliver radiation to solidify the flowable material located on the exposure zone.

In another embodiment, a device for three-dimensional (3D) printing of structures in a vertical orientation can comprise a construction frame, a material dispenser with a flowable build material in the material dispenser, and a construction area and a separate build platform, both positioned horizontally within the construction frame and configured for inverted build of a solidified 3D structure there between. The build platform can be moveable vertically within and configured to rotate within the construction frame and the material dispenser can be positioned to deliver the flowable material onto an exposure zone of an upper surface of the construction area. The device can also comprise one or more vertical-cavity surface-emitting laser (VCSEL) chips positioned to deliver radiation to selectively solidify the flowable material located on the exposure zone and the build platform can be configured to receive and retain the build material delivered on to the upper surface of the construction area as the build material solidifies and to move vertically upward and to rotate within the construction frame.

In yet another embodiment, a device for three-dimensional (3D) printing of structures in a vertical orientation can comprise a construction frame, a material dispenser with a flowable build material in the material dispenser, and a construction area and a separate build platform, both positioned horizontally within the construction frame and configured for inverted build of a solidified 3D structure there between. The build platform can be moveable vertically within and configured to rotate within the construction frame and the material dispenser can be positioned to deliver the flowable material onto an exposure zone of an upper surface of the construction area. The device can also comprise one or more vertical-cavity surface-emitting laser (VCSEL) chips positioned to deliver radiation to solidify the flowable material located on the exposure zone, wherein the material dispenser is on a rotary table configured to rotate in relation to a fixed base and the build platform can be configured to receive and retain solidifying build material delivered on to the upper surface of the construction area and to move vertically upward and to rotate within the construction frame.

These and other further embodiments, features and advantages of the invention would be apparent to those skilled in the art based on the following detailed description, taken together with the accompanying drawings, in which:

BRIEF DESCRIPTION OF THE DRAWINGS

FIG. 8 is a bottom view of a removable build platform insert for a 3D printer incorporating features of the present invention;

FIG. 14 is a perspective view of a radiation source for a 3D printer component incorporating features of the present invention;

FIG. 15 is a perspective view of an alternative radiation source for a 3D printer incorporating features of the present invention;

FIG. 24A shows a front sectional view of a third VCSEL chip configuration embodiment incorporating features of the present invention;

FIG. 24B shows a front sectional view of a fourth VCSEL chip configuration embodiment incorporating features of the present invention;

FIG. 26 shows the print head of FIG. 25 incorporated with rotational components to form an embodiment of a rotatable print head platform structure incorporating features of the present invention;

FIG. 28 shows a top, front, perspective view an variant embodiment of a VCSEL-based light source incorporating features of the present invention.

DETAILED DESCRIPTION

Figure 1:
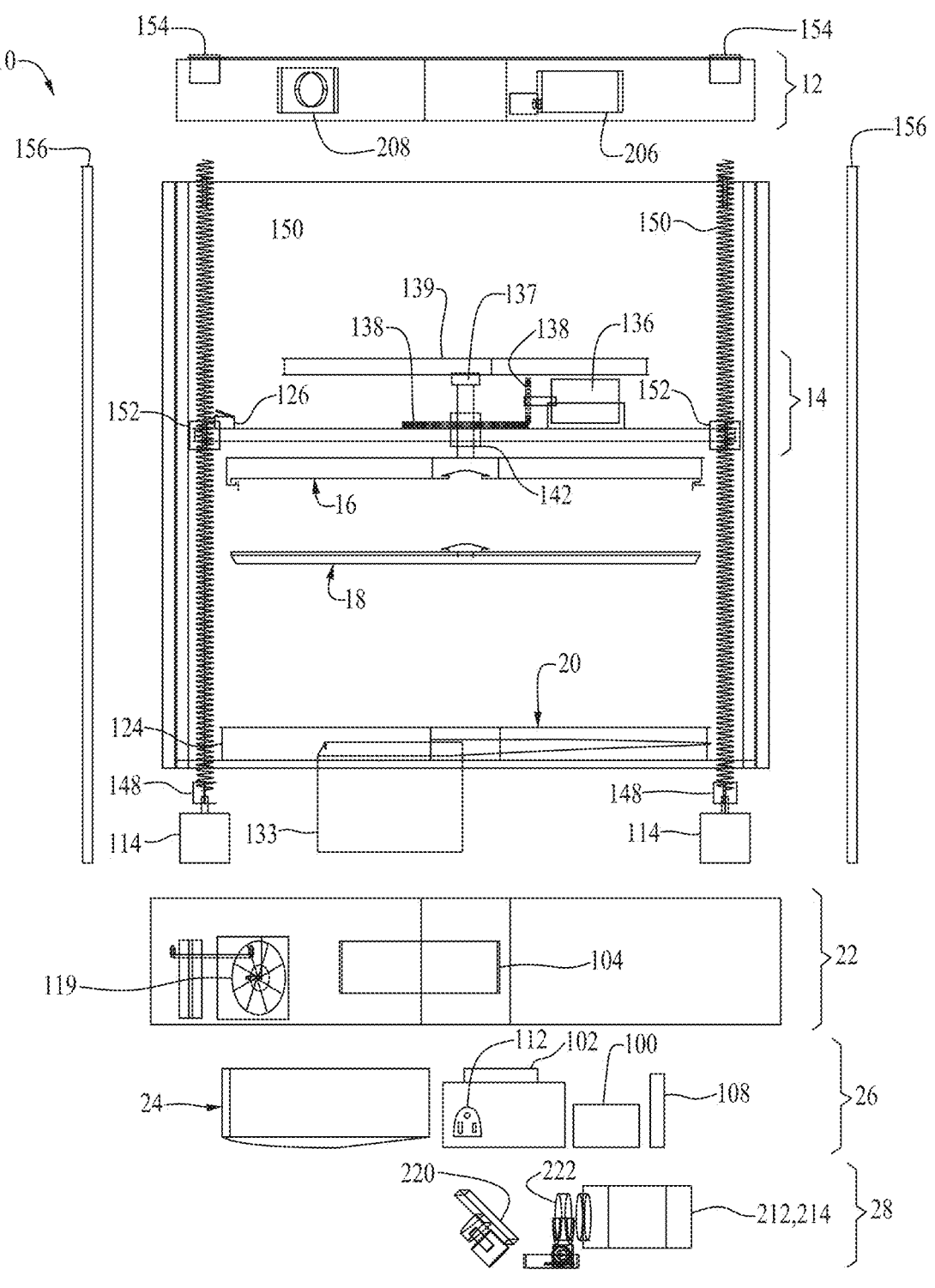
FIG. 1 is a cross-sectional exploded view of a 3D printer device incorporating features of the present invention.

The present disclosure sets forth methods and devices for efficient 3D printing that address conventional inefficiencies and deficiencies while utilizing a single compact device. As illustrative of such methods and 3D production devices, the dispensing of a photocurable substance onto transparent substrate, the selective curing and solidified of such materials and the retrieval of the solidified product is described. However, one skilled in the art, based on the teachings herein, will recognize that the apparatus and techniques described herein are not limited to the use of photopolymers along with the irradiation sources suitable to effect solidification, but can be readily adaptable to a broad range of flowable materials that can be rapidly solidified for the continuous formation of solid, three dimensional objects.

Throughout this disclosure, the preferred embodiments herein and examples illustrated are provided as exemplars, rather than as limitations on the scope of the present disclosure. As used herein, the terms "invention," "method," "system," "present method," "present system" or "present invention" refers to any one of the embodiments incorporating features of the invention described herein, and any equivalents. Furthermore, reference to various feature(s) of the "invention," "method," "system," "present method," "present system," or "present invention" throughout this document does not mean that all claimed embodiments or methods must include the referenced feature(s).

It is also understood that when an element or feature is referred to as being "on" or "adjacent" another element or feature, it can be directly on or adjacent the other element or feature or intervening elements or features that may also be present. Furthermore, relative terms such as "outer", "above", "lower", "below", and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention. As used herein, the term "and/or" includes any and all combinations of one or more of the associated list items.

The terminology used herein is for the purpose of describing particular embodiments only and is not intended to be limiting of the invention. As used herein, the singular forms "a," "an," and "the" are intended to include the plural forms as well, unless the context clearly indicates otherwise. For example, when the present specification refers to "a" source of radiation or "a" material it is understood that this language, in the first instance, encompasses a single source or a plurality or array of radiation sources and, in the second instance, a single or multiple sources of materials. It will be further understood that the terms "comprises," "comprising," "includes" and/or "including when used herein, specify the presence of stated features, integers, steps, operations, elements, and/or components, but do not preclude the presence or addition of one or more other features, integers, steps, operations, elements, components, and/or groups thereof.

It should be further recognized that reference to "solid" 3D structures refers to the materials of construction becoming solid and that the 3D product produced is not necessarily a solid structure and may include products with unfilled or hollow spaces therein or, if intended, an open, porous or lattice-like structure and may in fact include spaces therein enclosing a liquid or non-solid filling material.

Figure 22:
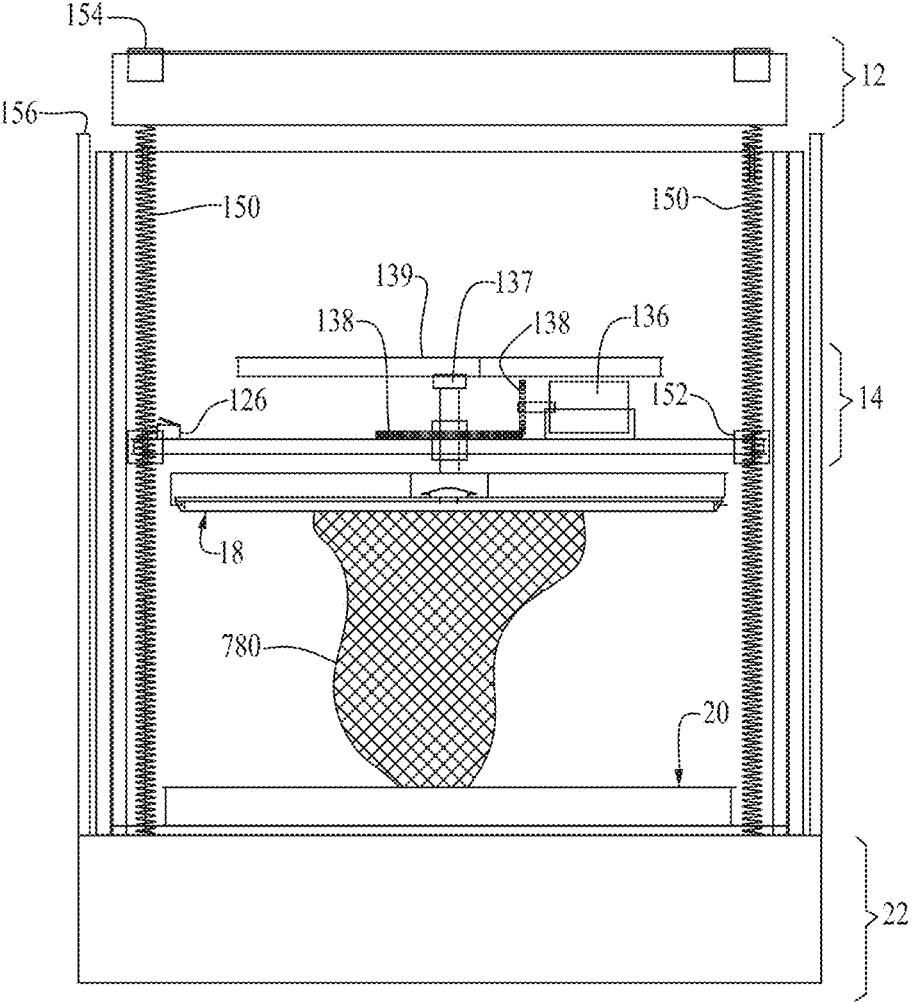
FIG. 22 is a side view of the 3D printer device of FIG. 1, with a 3D structure in the process of being printed.

For the purpose of describing the construction procedure, the term "inverted" or "inverted build" refers to the method and procedure of building a 3D structure which is suspended below a horizontal assembled build structure 16, 18 with a portion sometimes referred to as the "base" of the 3D structure attached to the build platform insert 18. The assembled build structure 16, 18 rises vertically from and above the construction/solidification area 20, as it prints a 3D structure 780 such as shown in FIG. 22.

In some embodiments, the basic essential functionality of the Heliolithography process can be carried out through the use of 3D model software files, which produces an image map that is sectionalized into a spiral or helical structures using computer assisted drawing (CAD)-type computer programs. The spiral structure can be converted into segmented images or bit data corresponding to points along the surface areas of the intended printed object that are to be solidified by the controllable projection of radiation onto exposed areas to selectively solidify the materials of construction.

The solidification method can utilize any build material capable of changing from a liquid or flowable state to a solid in response to a stimulus. For example, solidification can be the result of providing a radiative source which has the appropriate physical characteristics to cure or react the irradiated reactive liquid photopolymer material positioned on the rotating build platform. In some embodiments, the build material comprises a photopolymer solution containing at least one photoinitiator. The photoinitiator absorbs radiation at specific wavelengths producing free radicals which cause the rapid polymerization in the localized irradiated regions. Representative chemistries that can be used can comprise unsaturated polyesters, styrene-Polyenes, Thiols-Acrylates, and methacrylates-Cycloaliphatic epoxides. Alternatively, a second reactive material can be dispensed to cause a crosslinking of a primary polymer. Further, thermoplastics can be heated to liquefy and then rapidly cooled to solidify. As a still further alternative powdered metals or thermoplastics can be dispensed and "spot welded" use a heat source or laser beam.

A typical formulation for a photoreactive material used in such a process comprises one or more monomers (molecules of low weight that provide the specific desired properties and adhesion), Oligomers (medium length polymer chains that contribute additional properties such as increased tensile strength, stiffness, and elongation), photoinitiators (light sensitive materials that trigger free radical production to initiate the polymerization process), and additives such as fillers, pigments, dyes, adhesion promoters, abrasion resistant materials, UV light stabilizers and chemical stabilizers.

One example of a photopolymer formulation that can be used in the process described comprises a solution of monomer such as 1,6-Hexanediol ($HOCH_2(CH_2)4CH_2OH$) and Polyethylene Glycol Diacrylate ($(C_3H_3O)\cdot(C_2H_4O)_n\cdot(C_3H_3O_2)$) with one or more photoinitiators, phenylbis(2,4,6-trimethylbenzoyl)-phosphine oxide [$CH_3)3C_6H_2CO]2P(O)C_6H_5$ and Diphenyl(2,4,6 trimethyl benzoyl) phosphine oxide ($(CH_3)3C_6H_2COP(O)(C_6H_5)_2$) at concentrations between 2 and 8 percent by weight.

Figure 2:
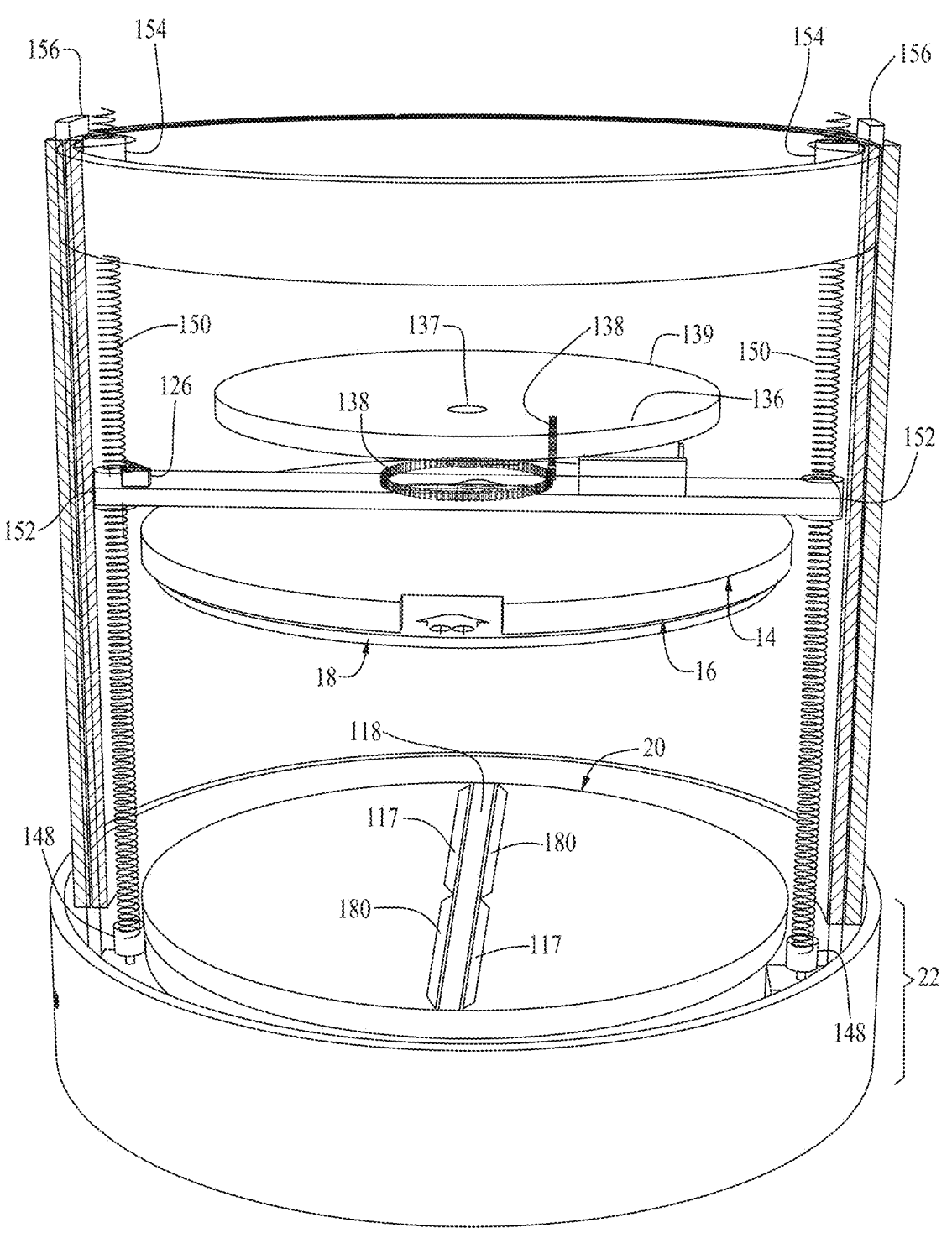
FIG. 2 is a front perspective view of the 3D printing device of FIG. 1 incorporating features of the present invention.

FIGS. 1-2 show a sectional and front perspective views respectively, of some of the major functional components of an example 3D printer 10 incorporating features of the present invention. The 3D printer 10 comprises an imaging unit 12, a z-axis elevator stage 14, also referred to as the construction frame, a build platform 16, and a build platform insert 18 which is configured to fit together with the build platform 16, to provide an assembled build platform (as shown in FIG. 2). Although the present disclosure sets forth a configuration utilizing both a build platform 16 and a build platform insert 18, it is understood that the use of the methods and devices incorporating features of the present invention can utilize the build platform 16 alone without the build platform insert 18. Below the assembled build platform 16, is a construction/solidification area 20, a material storage area 22, a material cartridge/reservoir 24, electronic components 26, and a solidification mechanism 28. These components and their various sub components are discussed in greater detail throughout the present disclosure.

With reference to FIGS. 1 and 2, a 3D file (corresponding to a desired 3D object to be produced (the "print task")) is loaded into the memory of a print processor 100, which is configured to operate in conjunction with a CPU and solid state memory storage, to control the 3D printer 10. This print task can be transferred through the CPU and into solid state storage in a variety of ways know in the art. For example, it can be transferred from a remote server or program using internet protocol (through its Ethernet or WiFi connection 102), or it can be loaded manually by the user using a control interface 104 and/or universal serial bus (USB) data transfer ports. Control interface 104 can be any control interface known in the art. In the embodiment shown, control interface 104 is a touch screen interface, such as an LCD touch screen interface. The data can be uploaded to the apparatus which performs self-tests and priming functions to ready the machine for printing. Motor drivers 108, work in conjunction with the print processor by receiving low-voltage signals from the print processor 100 and generating controlled current signals needed to properly drive the various motors used throughout the printer. Other electronics within the electronics component assembly 26 of the 3D printer 10 include a power supply 112, which can transform voltage input to provide regulated power to all the components of the electronic component assembly 26. It is understood that while the power supply 112 is depicted as comprising an outlet, any suitable power supply know in the art, for example, battery- or generator-based power supplies, are within the scope of the present disclosure.

The printer comprises a build platform 16 and a construction area 20. Build platform 16 can be permanently installed or replaceable, e.g. being removable connected to z-axis elevator stage 14. The build platform 16 can be rotatable clockwise and/or counterclockwise or otherwise moveable in one or more directions and can have a variety of shapes including any regular or irregular polygon or can be circular or substantially circular. The build platform 16 can be lowered towards the solidification area 20 using z-axis stepper motors 114; a sensor 124 can be used to determine when the desired layer-height of an object to be produced has been reached. The printer will then begin the print cycle by first ensuring all moveable axes are in the correct starting position. For the z-axis, the starting position is typically one layer height above the cure zone (above the home position). However, it is understood that other starting positions can be designated as needed for a particular print task and/or as newer technology becomes available and is incorporated into devices and methods according to the present invention. For the rotation axis, the starting position is the same as the home position.

The homing process, which establishes the '0', or start position of each axis, uses sensors 124, such as hall effect sensors, in a closed-feedback system to determine the hard limits of each axis. Hall effect sensors are known in the art and typically comprise a transducer that varies its output voltage in response to a magnetic field. Hard limits for each axis can be driven from a pair of linear sensors, such as hall effect proximity sensors 124, positioned at each limit. When utilizing hall effect sensors, one or more small magnets 126 can be embedded in the moveable z-axis carriage 14. Because the sensors have a linear analog output directly proportional to magnetic flux, each sensor can be calibrated with its own trigger voltage.

Once hard limits are determined, printer firmware maintains in its memory the current position of each axis relative to its home position. When the printer is powered on, it can be programmed to re-home each axis before accepting new print tasks, for example, to compensate for situations wherein an axis has been moved while the printer was powered off. The current position of each axis can be stored as an integer number of motor steps from zero. In these configurations, moving the axis "up" will increase this internal counter, and moving the axis downwards will decrease the counter.

Soft limits can also be put in place to configure the printer such that the printer will never allow a motor movement that will send the axis below the lowest position or past the maximum allowed value, which is specific to each axis' length. If an axis is directed to exceed these preset limits the printer controller will halt the print task and issue an appropriate error message. Also, if there is ever a programming error and the printer attempts to move past the soft limit, the hard limits built into each axis will halt the axis movement and the print task before any damage to the printer occurs, requiring entry of an appropriate soft reset.

Figure 10:
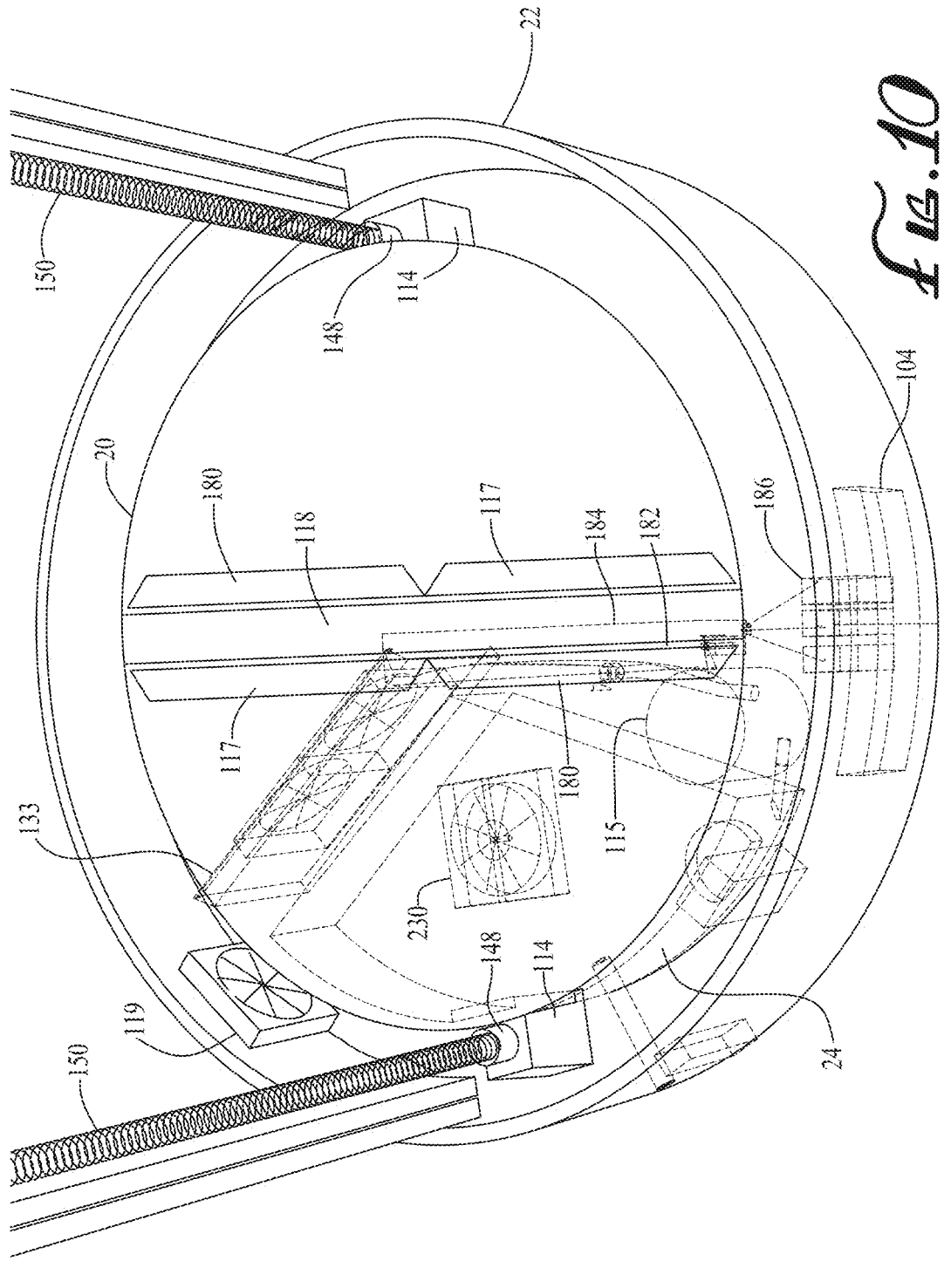
FIG. 10 is a partial internal perspective view of a base material storage and construction area of a 3D printer incorporating features of the present invention.

The material storage area 22 can hold a replaceable material cartridge 24. The material cartridge contains electronically stored information which can be read by the 3D printer 10 to determine the amount of material in the cartridge 24 and other specifics about the material in the cartridge. An agitator mechanism, such as a magnetic stirring device 230, as shown in FIG. 10, can also be included and be located below the cartridge 24 to ensure materials are uniformly mixed prior to dispensing. One or more atmospheric control mechanisms 119, such as an electronic heating mechanism and/or a fan and/or humidifying control systems can also be used to alter the temperature of construction material in the material cartridge 24 or control the exposure to moisture if needed, for example, to reach a desired viscosity or reduce detrimental moisture prior to dispensing. A thermal sensor and/or humidity sensor can also be used to monitor when a desired material temperature is reached or that no excess moisture is present.

Referring to FIG. 10 a material pump 115 can be used to move photocurable build materials, such as liquid-state photocurable materials, from the material reservoir 24 to a material depositor. At least a minimal amount of material needed for a proper thickness coating on the build surface can then be dispensed. A material such as photopolymer resin can be introduced to the print area by the printer's internal plumbing system, driven by a small pump. With reference to FIG. 1, as resin is introduced, it flows down resin supply channels in a print head and flows over the cure zone and into resin return channels 117. Excess liquid resin is continuously pulled from the resin return channels 117, filtered and returned to the resin tank or discarded, if appropriate.

The assembled build platform 16, 18 can then be rotated, which spreads liquid resin over the solidification area, depositing and evenly spreading the photopolymer to a desired layer thickness. In some embodiments, the desired thickness is between 0.001 and 0.1 mm in thickness. A secondary material dispenser can optionally be used to infuse the primary material with additional additives, pigments, dyes, coloring agents into the primary photopolymer prior for curing. In an alternative embodiment, the secondary material can be a material reactive with the first material to effect solidification. It is understood that while the embodiments described herein set forth a rotatable build platform and stationary material dispensers and solidification areas, the reverse configuration would also work and be within the scope of the present application, wherein material dispensers and solidification areas rotate under a stationary build platform. In an alternative embodiment, the material dispenser, solidification and build platform can be simultaneously or alternatively moved in a programmed manner.

Once a continuous resin flow is established, the assembled build platform 16, 18 begins to rotate before the solidification process begins to establish a uniform flow of material across a material spreader. The rotation of the assembled build platform 16, 18 is performed with the use of a variable speed motor 136 that drives a central shaft 137 with engaged 90 degree gears 138 that rotate both the scanner and assembled build platform 16, 18 that are suspended on one or more bearings 142 connected to the z-stage 14. The build platform can be set to spin for set number of rotations, also known as the "spin-up" period. The rotation of the assembled build platform 16, 18 helps to draw new material over the cure zone and ensures that no air is trapped. Without pausing rotation, the printer begins the printing process by activating the solidification mechanism to begin the photo-cure process.

Continued rotation of the build surface (or movement of the feed mechanisms or other components programmed to move) advances the print materials onto an across an exposure/cure zone 118, which is preferably glass or another sturdy, transparent and preferably low adhesion medium. The exposure zone 118 can be treated with a non-stick and abrasion resistant coating, which prevents or retards cured material from adhering to its surface. Selective solidification of the segment of material deposited between the build platform and the transparent construction surface, is carried out by one of a number of possible combinations of radiation sources and radiation directing mechanisms used to direct the radiation through the transparent substrate portion of the solidification area onto and into the liquid construction materials. Material level sensors in the material cartridge 24 are also used to monitor material levels and are capable of pausing or slowing a print cycle if material levels become critically low.

The data stored in the memory of the printer is transmitted to the solidification mechanisms 28 in a programmed manner to selectively expose portions of the photopolymers through the transparent substrate, solidified in a manner corresponding to the structural information relating to specific segments of the 3D model which is being constructed. The Heliolithography process, which appears to be continuous can actually comprise many small cumulative "steps" for each full rotation of the build platform, pausing at each step for a small amount of time, typically between 5-10 milliseconds required to allow the polymerization reaction to progress past a critical "degree of cure" (i.e., a level of solidification) needed to sufficiently attach to the build platform insert 18 and firmly adjacent previously solidified portions of structure being formed. As an alternative the build platform insert can comprise a removable retention means added to the lower surface thereof which can be incorporated onto the first layers of the product being built so as to allow removable attachments of that structure, once completed, from the build platform insert. In some embodiments, referring to FIG. 8, the holes can be shaped to add alternative retention structures 770 such as inverted cones or additional structures 770 can be added to provide further retention of the structure being built. Unsolidified material is simultaneously removed and recycled back into the reservoir.

As the portion of the structure being built is sufficiently solidified, the rotating assembled build platform 16, 18 continuously removes the solidified material from the exposure zone 118 and provides new construction material spreading across the construction area 20. Solidified material is also, at the same time, rotated towards a recycling area comprising a drain 132, such as an excess materials stripper, that removes any unsolidified materials from the growing structure which are then filtered and recycled back into the construction materials reservoir 24, and a further curing mechanism 133, if necessary.

As each additional step of the build process is reached, new information is provided to the curing mechanism 133, so as to solidify the resin where and when needed. As the assembled build platform 16, 18 rotates, it is continually raised by the linear actuators in a ratio such that the assembled platform 16, 18 is raised one layer height for each revolution. In some embodiments, one layer height corresponds to the number of radii of an intended curing piece of the structure. For example, in embodiments utilizing one material while curing down the diameter (i.e. radii) a full layer would be cured during every 180 degree rotation of the build platform. In some embodiments utilizing multiple cure areas, but still utilizing a single material, a single layer can be cured faster with less rotation, for example, at approximately 360 degrees/number of cure radii. The linear actuators include stepper motors 146 that are coupled via coupling devices 148 to fasteners, such as lead screws 150, so as to raise the z-stage which is connected with fastener acceptor, such as a lead screw nut 152, when rotated. Bearings 154 and linear guide rails 156 mounted in the z-stage 14 stabilize this vertical movement.

This cycle is repeated until the spirally deposited and solidified material is built up and the constructed three-dimensional object suspended below the assembled build platform 16, 18 but above the construction/solidification surface 20 is completed. This process is repeated in a continuous fashion until, cumulatively, the total height of the printed object has been reached. Once this is accomplished and the cure mechanism has no remaining information in its input buffer, the curing mechanism (the photon source) is shut off and the rotation of the build platform is stopped. The resin flow is shut off and all remaining liquid resin drains back into the material cartridge. The machine initiates a motion sequence raising the build platform to its upper soft limit and brings the rotation of the platform to its homed '0' position.

In addition to utilizing preexisting software print modules, methods and devices incorporating features of the present invention can also utilize scanning and other imaging units. In some embodiments, objects can be placed on a scanner platform 139 and the printer 10 can be instructed to begin scanning. The z-stage 14 raises the object to an initial height to begin a scan. A pattern imaging device 206, such as a projector, or laser can be used to project a known geometric pattern on the surface of the object. A recording device 208 can then record the distortions to this known geometric pattern as the scanner platform 139 rotates driven by the same variable speed motor 136 and drive gears 138 as the build platform. The height of the object can be raised or lowered using the linear actuators to perform subsequent passes to generate greater coverage of the object geometry to include under cuts and over hangs. This information is then sent to the processor 100 and transmitted via Ethernet, WiFi or wired connection 102 to a computer or cloud system for the reconstruction of the scanned object.

Many different solidification mechanisms can be utilized with methods and devices according to the present disclosure. A solidification mechanism 28 used in the device of FIG. 1 can include any radiation source such as high power diodes 212, 214, with the radiation directed through correcting and focusing optics 222 and onto a motor controlled mirror scanning system 220 for directing the radiation through the exposure zone 118 of the cure zone. Other solidification mechanisms are discussed further below.

Figure 3:
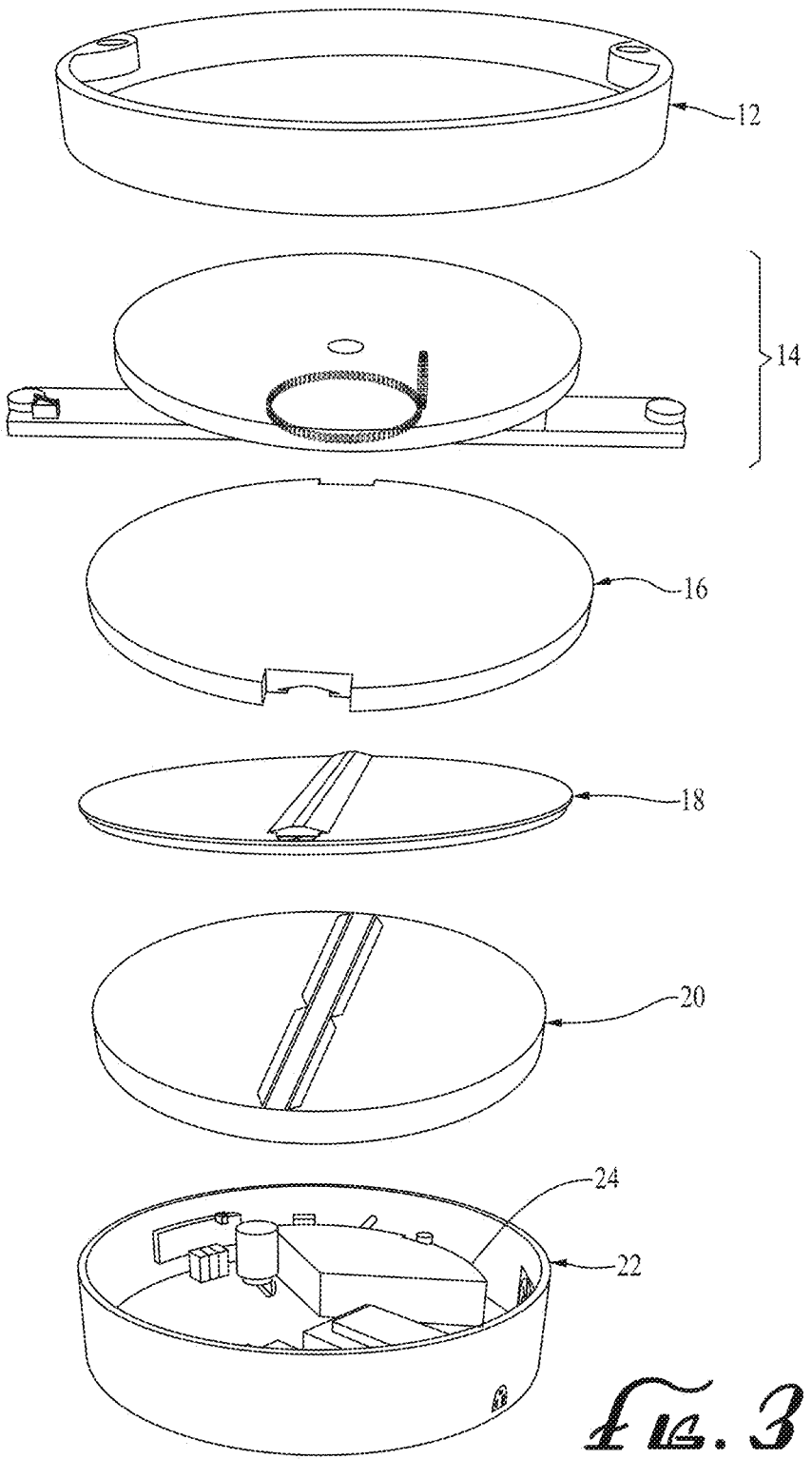
FIG. 3 is a cross-sectional exploded view of components of a 3D printer device incorporating features of the present invention.
Figures 4, 5:
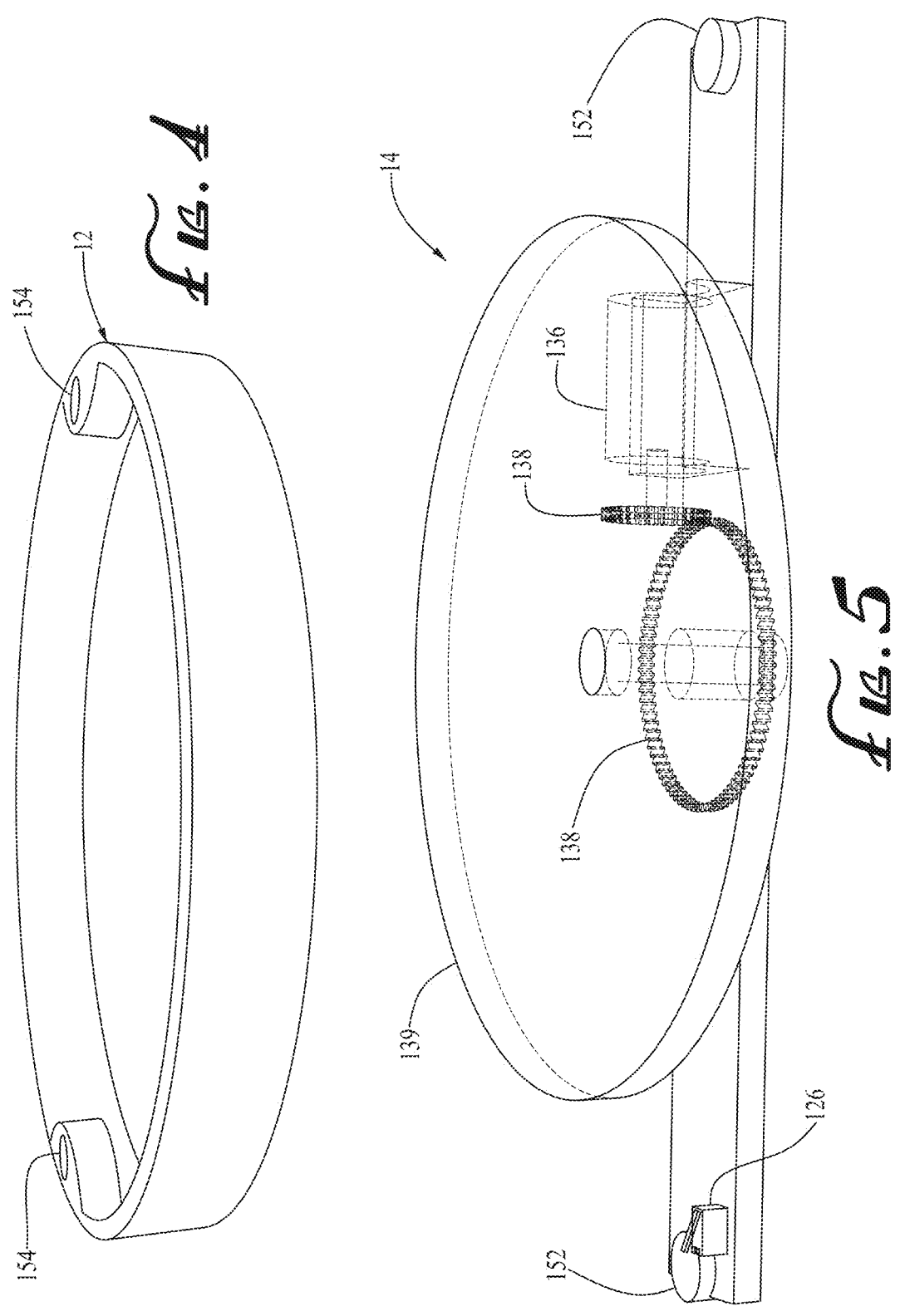
FIG. 4 is a perspective view of an imaging component of a 3D printer incorporating features of the present invention.
FIG. 5 is a perspective view of a z-axis elevator stage of a 3D printer incorporating features of the present invention.

FIG. 3 shows an exploded view of an imaging unit 12, a z-axis elevator stage 14, a build platform 16, a build platform insert 18 which is configured to fit together with the build platform 16 to form an assembled build platform 16, 18 (as shown in FIG. 2), a construction/solidification area 20, a material storage area 22, and a material cartridge/reservoir 24. FIG. 3 shows these components aligned in correct configuration according to some embodiments incorporating features of the present invention, such as the embodiment 10 depicted in FIGS. 1-2 of the present application. FIG. 4 shows an enlarged view of the imaging unit 12, which comprises a pattern imaging device 206 and a recording device 208 as discussed above. The imaging unit 12 can be connected to z-axis elevator stage 14 via bearings 154 as shown in FIG. 1.

FIG. 5 shows a more detailed view of z-axis elevator stage 14, which comprises magnets 126, which can interact with hall effect sensors to relay the position of the z-axis stage 14, a variable speed motor 136 that drives a central shaft 137 with engaged 90 degree gears 138, a scanner platform 139 and fastener acceptors 152. These components can function as set forth above.

Figure 6:
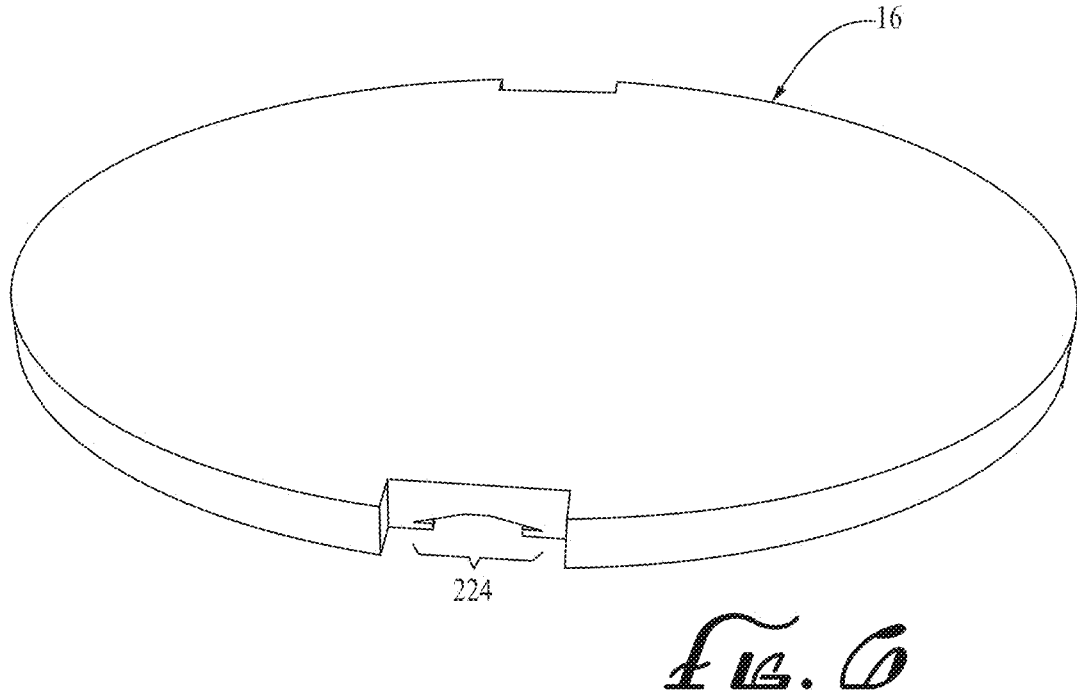
FIG. 6 is a perspective view of a build platform attachment plate for a 3D printer incorporating features of the present invention.
Figure 7:
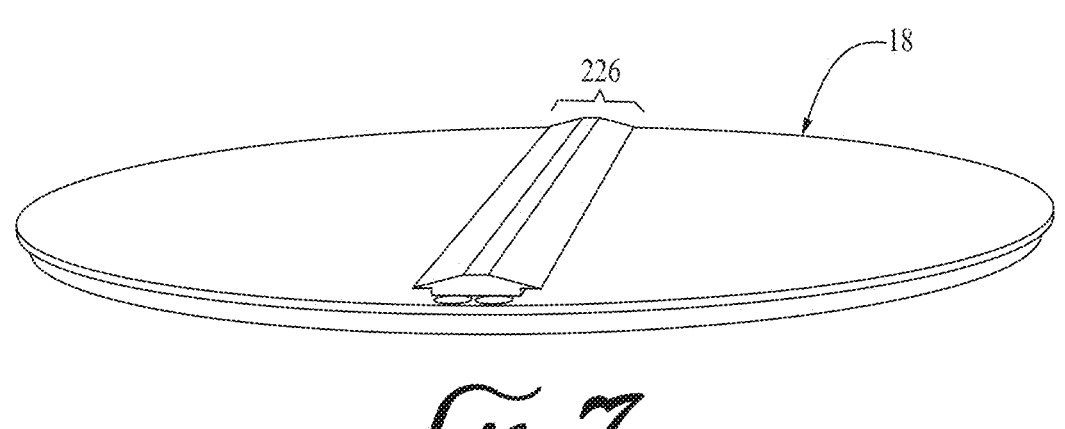
FIG. 7 is a perspective view of a removable build platform insert for a 3D printer incorporating features of the present invention.

FIG. 6 shows an enlarged view of the build platform 16. One aspect more clearly shown in FIG. 6 is the insert accepting portion 224. FIG. 7 shows the build platform insert 18 and the inset connecting portion 226. The insert accepting portion 224 of the build platform 16 as shown in FIG. 6 can be configured to interact or mate with the inset connecting portion 226 of build platform insert 18 shown in FIG. 7 such that the two components can be connected into an assembled build platform 16, 18 (as shown in FIG. 2, for example). This allows the build platform insert 18 to be readily removed and replaced in the device. FIG. 8 shows a bottom view of the build platform insert 18 comprising arrays of holes 228 allowing increased surface area for building materials. The removable build platform insert 18 or a removable attachment to the build platform insert 18 can be separated from the complete product or remain as a piece of the complete product.

Figure 9:
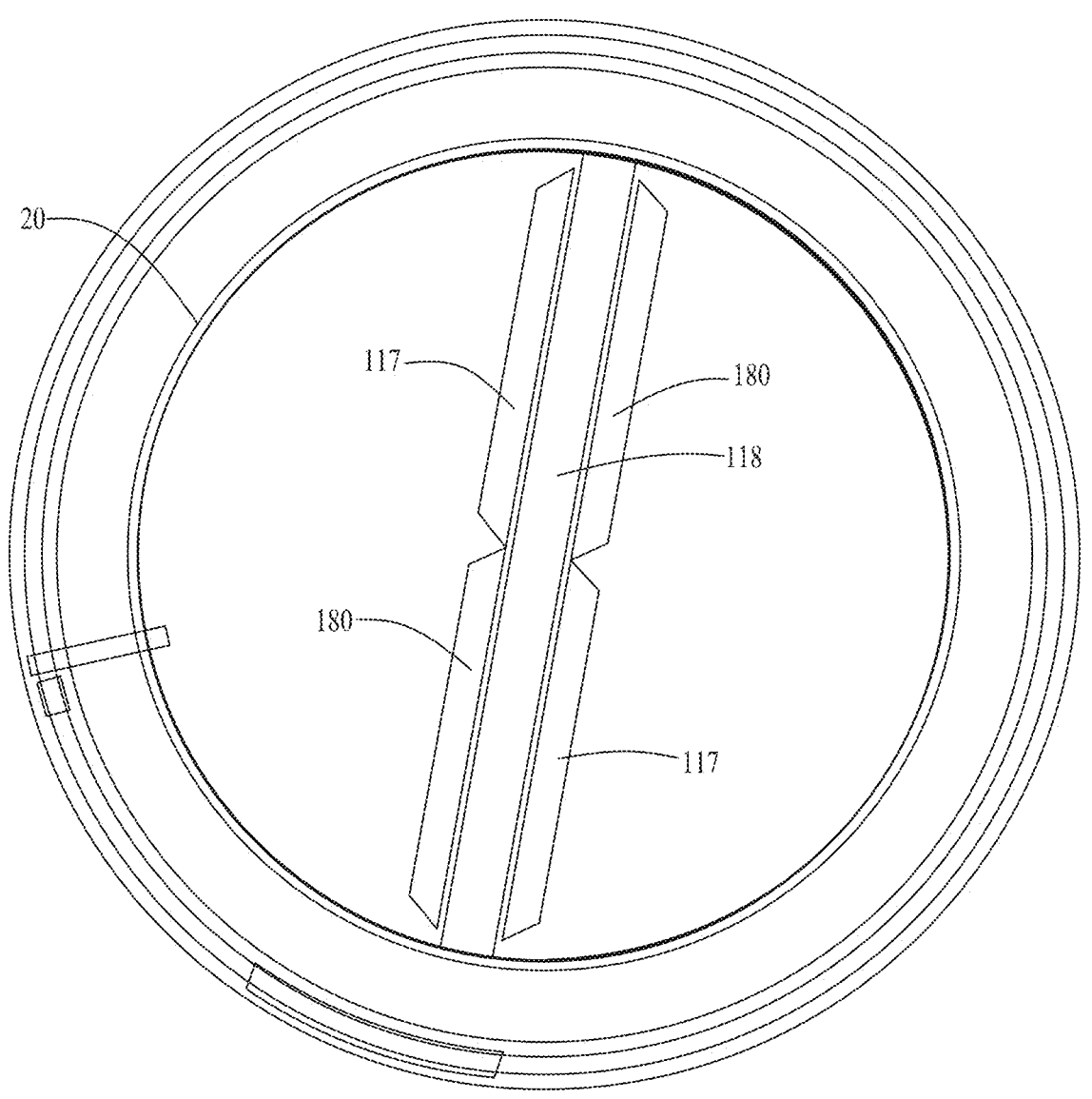
FIG. 9 is a top view of a view of an expanded solidification area/vat for a 3D printer incorporating features of the present invention.

FIG. 9 shows an enlarged view of the construction/solidification area 20, comprising a primary material dispenser 180, a cure zone 118, resin return channels 117, a material spreader 182, and a curing mechanism 133, such as an excess materials stripper, these components functioning as set forth above.

FIG. 10 shows an enlarged top perspective view of the material storage area 22 and the material cartridge reservoir 24. Also shown in FIG. 10 are the control interface 104, a material pump 115, resin return channels 117, an exposure/cure zone 118, which is a transparent substrate, an atmospheric control mechanisms 119, curing mechanisms 133, a coupling devices 148 attached to fasteners 150, linear guide rails 156 within the coupling devices, a primary material dispenser 180, a material spreader 182, a secondary material dispenser 184 and a magnetic stirring device 230. FIG. 10 also shows additive material cartridges 186 which can be configured to feed secondary material through primary material dispenser 180 and/or a secondary material dispenser 184.

Figure 11:
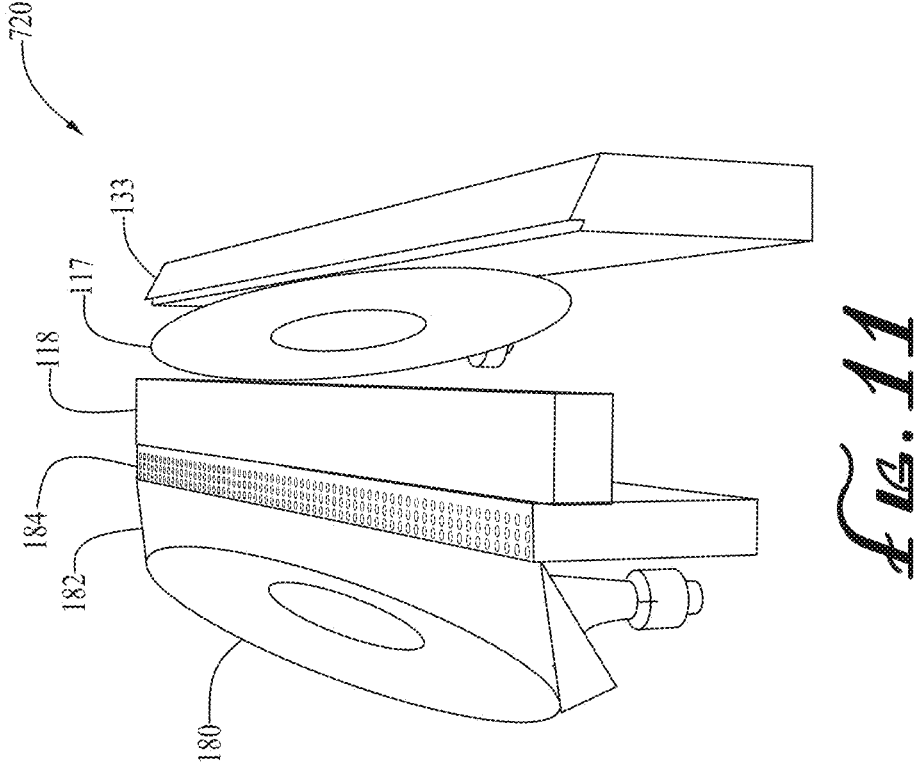
FIG. 11 is a perspective view of a complete solidification area of a 3D printer incorporating features of the present invention.
Figures 12A, 12B:
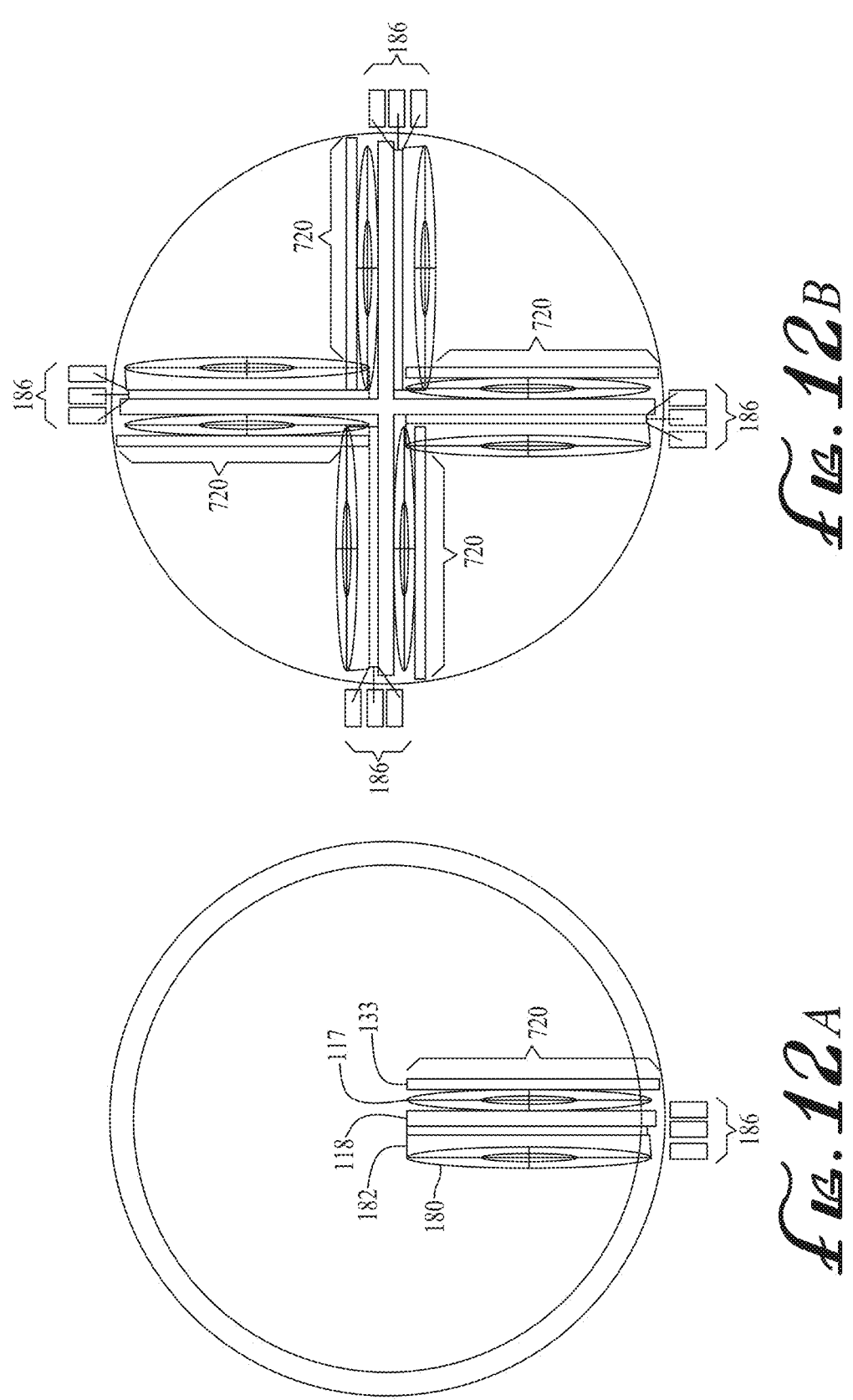
FIG. 12A depicts a single item being constructed radiating from the center of the build chamber floor of a 3D printer component incorporating features of the present invention.
FIG. 12B depicts multiple items under construction radiating from the center of the build chamber floor of a 3D printer incorporating features of the present invention.

FIG. 11 shows a condensed perspective view of a construction zone 720, comprising primary material dispenser 180, a material spreader 182, a secondary material dispenser 184, an exposure/cure zone 118, which is a transparent substrate, resin return channels 117 and curing mechanisms 133. The same structures are shown in FIG. 12A which shows a single construction zone 720 radiating from the center of the floor of the build chamber 21. FIG. 12A also shows an additive material cartridge structure 186. FIG. 12B shows an alternate configuration, wherein multiple construction zones 720 and additive material cartridge structures 186 radiate from the center of the floor of the build chamber 21.

Figure 13B:
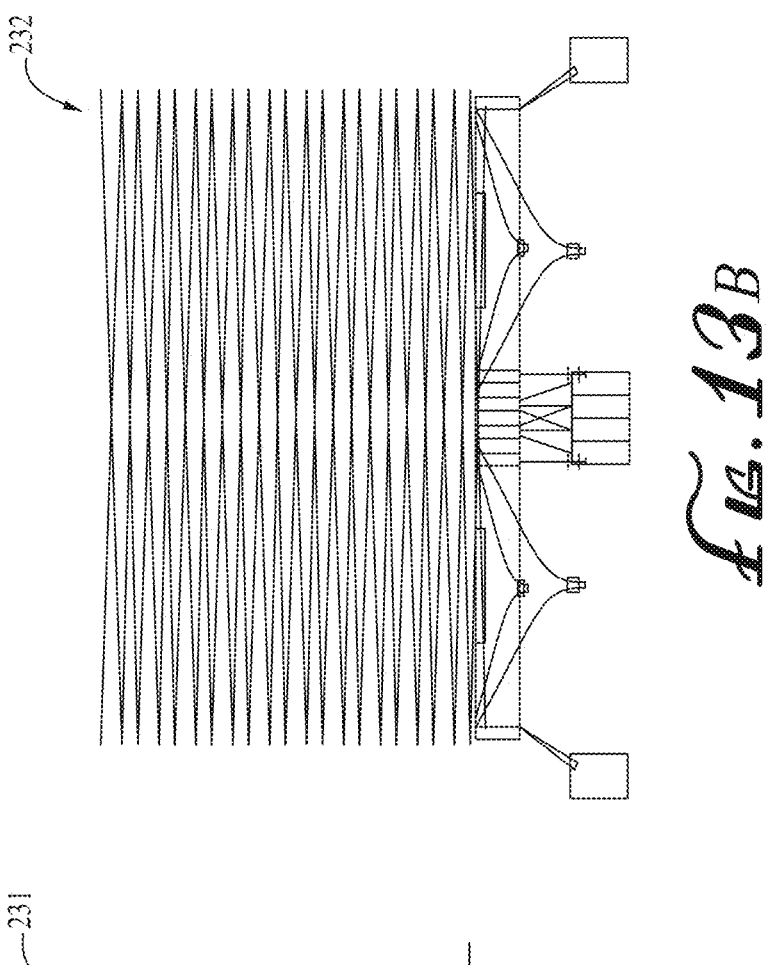
FIG. 13B is a side view a continuous spiral layer construction buildup utilizing multiple construction areas of a 3D printer incorporating features of the present invention.
Figure 13A:
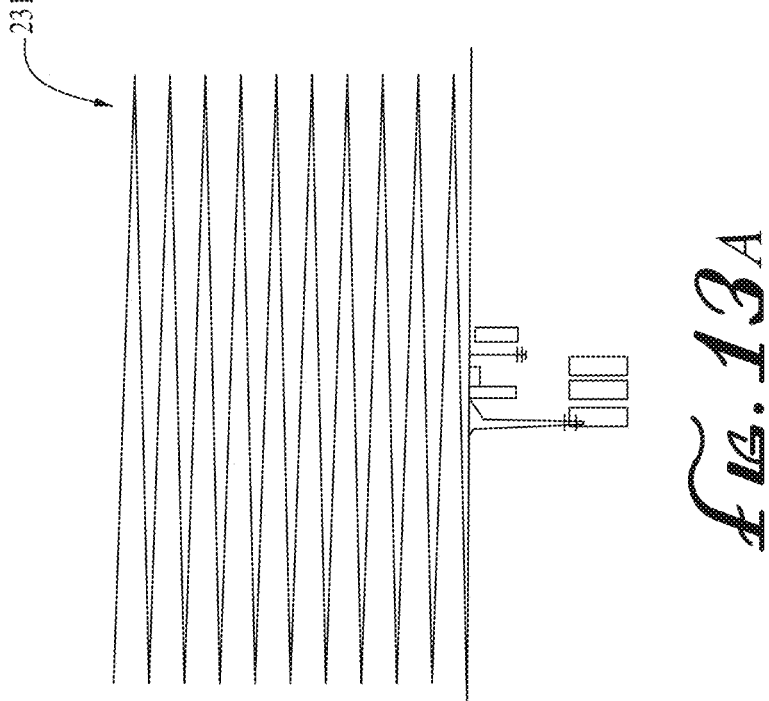
FIG. 13A is a side view of a continuous spiral layer construction utilizing a single construction buildup area of a 3D printer incorporating features of the present invention.

For illustrative purposes, FIGS. 13A and 13B are side views of a spiral layer printing construction for a single construction area 231 and for multiple construction areas 232, respectively. The use of multiple construction areas further provides the benefits of simultaneous layer creation or the expanded ability for a greater range of construction material options wherein each construction area can dispense and solidify a unique range of materials into a single layer. For depositing into a single construction layer the subsequent heights of the construction substrates can also match the pitch of the spiral layer to be created and insure consistent layer thickness at each construction area. However, this is not necessary to achieve the desired color accuracy. This process can also be utilized wherein the build platform is rotated but raised only after one complete rotation is accomplished. This is of particular value where multiple construction areas of the same height are used. In such instance a consistent layer height for each material segment can be efficiently achieved. In actual operation the depicted expanded spiral can never occur as proper solidification techniques adhere and solidify together adjacent subsequent layers of the spiral laydown as they are formed.

Various solidification mechanisms and radiative sources can be utilized with devices and methods incorporating features of the present invention. FIG. 14 shows the solidification mechanism 28 of FIG. 1. When a photopolymer is used solidification mechanisms 28 can include various radiation sources such as high power diodes, LEDs or lasers 212, 214. In a particular embodiment the radiation is directed through correcting and focusing optics 222 and onto a controlled scanning mirror system 220 adapted to scan the incident light such as by use of a motor drive for directing the radiation through the exposure zone 118. The solidification mechanisms 28 can further incorporate a DMD Chip Micro mirror device (not shown).

FIG. 15 depicts a solidification mechanism 235 utilizing a Microelectromechanical systems (MEMS) or light valve switches. Depicted are high power diodes 212, 214, similar to the diodes that can be utilized with solidification mechanisms 28 described above, coupled to light/wave guides 236 in an optics system 238 for focusing onto a light switch 240 assembly. The light switch 240 is a mechanism allowing radiation to pass through at desired locations arranged in an overlapping hexagonal grid system. Fans and heat sinks 242 and a TEC temperature control system 244 can also be utilized for temperature control.

Figures 16, 17:
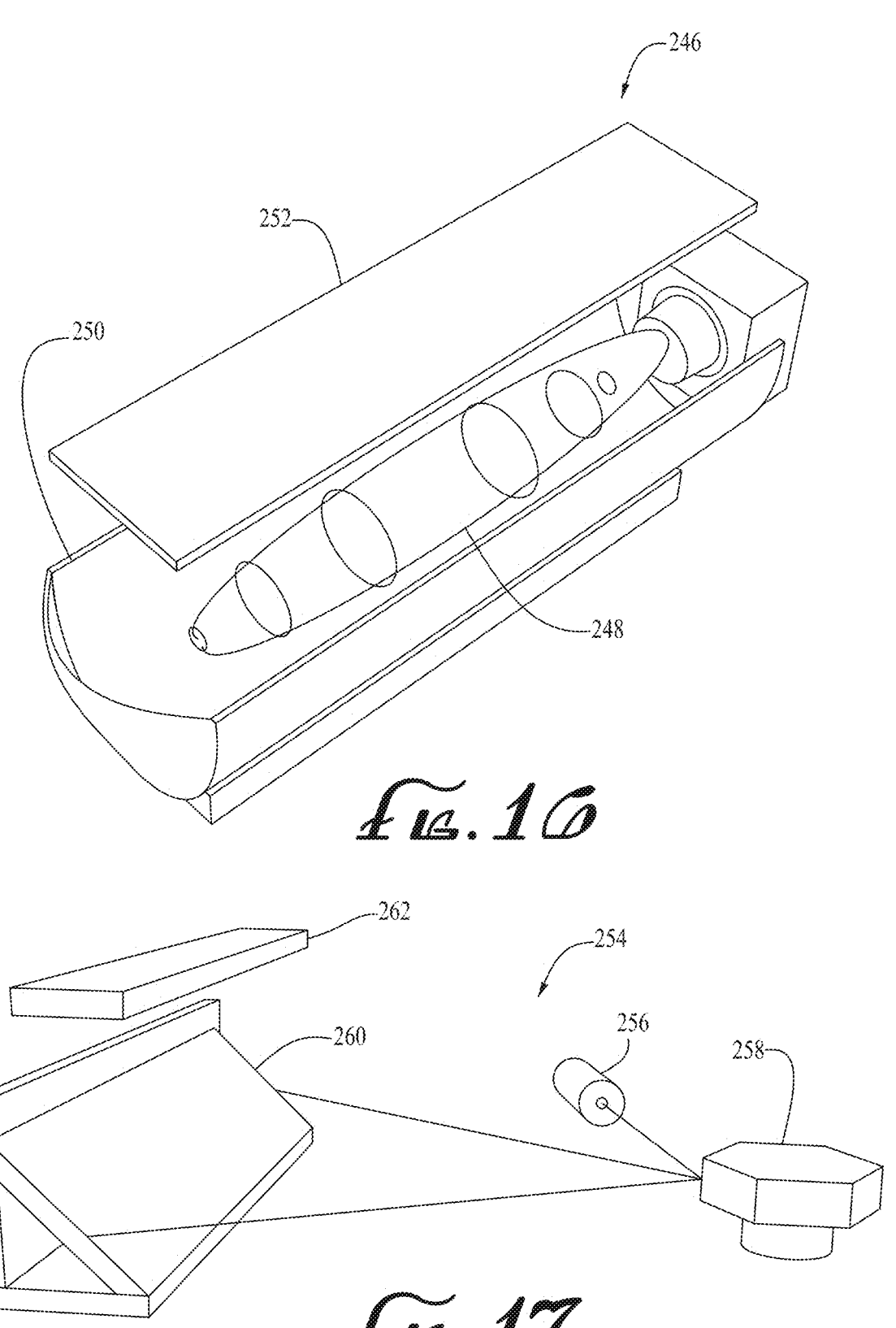
FIG. 16 is an expanded perspective view of another radiation source for a 3D printer incorporating features of the present invention.
FIG. 17 is a perspective view of a fourth radiation source for a 3D printer incorporating features of the present invention.

FIG. 16 shows an alternative solidification mechanism comprising a board radiation source 246 such as an ultra-high performance (UHP) Mercury Vapor lamp 248. This mechanism uses a convex reflector 250 for focusing the radiation from the source 246 towards a digital mask 252 such as a LCD screen. The digital mask controls radiation passing through according to a pixel matrix programmed to block or transmit the radiation flowing there through.

FIG. 17 is a further alternative solidification mechanism using a radiation source 254 comprising a high power diode 246 and a motor controlled mirror, such as a polygonal multi-sided mirror 258. The mirror is rotated in relation to the diode, or vice versa, to scan the radiation in a linear direction corresponding to its angle of rotation. A 45 degree secondary mirror 260 is used to reflect the radiation towards an exposure zone such as the transparent substrate of the cure zone 118. This secondary mirror 260 can be motor controlled to provide a second dimension of scanning. An optics system 262 is also used to correct for distortions and scanning angles. In some embodiments, an F-theta optic system is utilized.

Figure 18:
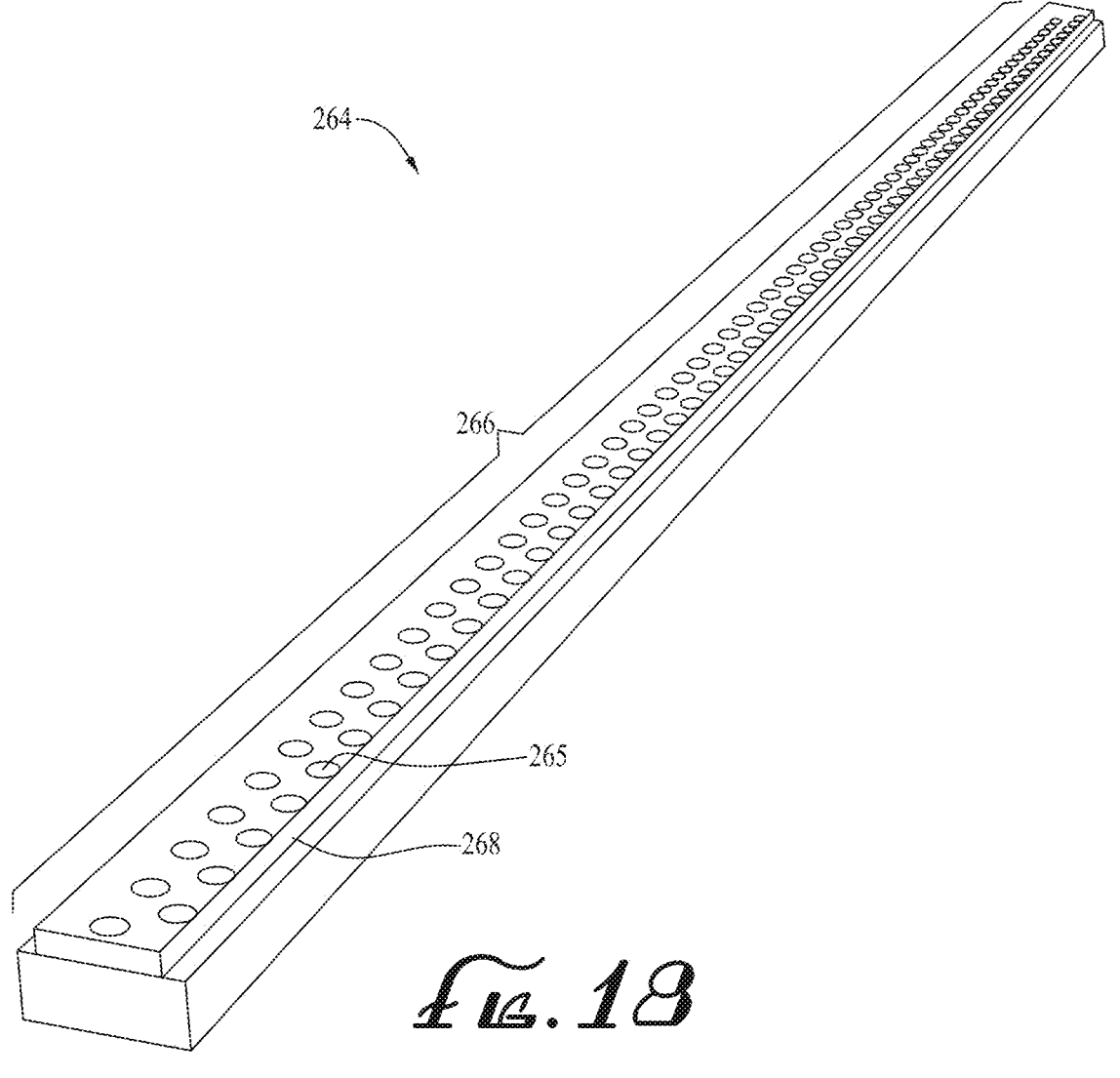
FIG. 18 is a perspective view of a fifth radiation source for a 3D printer incorporating features of the present invention.

FIG. 18 shows further alternative solidification mechanism 264 comprising an array of individually addressable diodes 265 such as a micro-LED array 266, that can be used independently to control the solidification of the construction material. An optic system 268 can also be used to focus the radiation to a desired point size between 5 and 50 nm.

A still further alternative can be to use one or more laser beams, which may or may not require focusing mirrors, as the laser beams can be individually positioned or repositioned as necessary to deliver narrow, pin point beams of controlled frequency light to specific target locations.

With reference to FIG. 22 a specific product is constructed utilizing devices incorporating features of the invention. Using the scanning techniques described above, the dimensional features and surface characteristics of a three dimensional object measuring about less than about 10.5 inches in diameter and less than about 9.25 inches tall were scanned and the scanned data relating thereto was stored in the memory of a 3D build system such as shown in FIGS. 1-2. A photo photopolymer, preferably an acrylate methacrylate resin comprising 2-8% of a combination of diphenyl (2,4,6 trimethyl benzoyl) phosphine oxide, Thermoplastic Polyolefin (TPO), and/or Phenylbis (2,4,6-trimethylbenzoyl) phosphine oxide, was added to the material storage area 22. A light source suitable to effectively cure the photopolymer within 3-10 cc/sec comprising an array of micro LED (365-385 nm) to provide irradiation of the polymer over at least about 10.5" width or diameter (approximately 200-300 watts/cm$^2$). Additional light sources, including light sources utilizing one or more vertical-cavity surface-emitting lasers (VCSELs), are discussed in greater detail further herein.

The polymer was metered at a rate of about 3-10 cc per second which is dependent on the dimensions of the object being built distributed onto a 12 inch diameter construction area (cure surface) with a transparent exposure zone, which can be a smaller portion of the construction area, for example, a 1 inch wide portion that is transparent to a certain type of radiation, such as UV radiation, which can be made of glass. This exposure zone had been previously treated with a low adhesion material such as Fluorinated ethylene propylene (FEP) and/or Polytetrafluoroethylene (PTFE), know commercially as Teflon®, to retard or prevent adhesion of the cured polymer to the cure surface. The resultant liquid polymer film was about 20-100 microns thick. The rotation rate of the built platform is primarily dependent on size and density of the product being built and the solidification rate of the material of construction, which in turn is dependent on the intensity and frequency of the irradiation source. The platform was rotated at a rate of 2-12 rpm.

The speed of construction can be enhanced by use of multiple cure areas and multiple feeds. However, construction of a structure is dependent on the size of the structure and the thickness of build material that can be cured per exposure. A general equation for estimating build speed is as follows:

$$\text{Build Speed} = \frac{1}{(RPM * \text{Number of Radii})} \times \frac{\text{TOTAL HEIGHT}}{\text{LAYER HEIGHT}}$$

Accordingly, for a structure with an intended height of 9 inches (228.9 millimeters) with a layer height of 50 microns (0.05 millimeters), a rotation speed of 5 RPM and a single cure zone, a build time is estimated to be approximately 915.60 minutes, which is approximately 15.26 hours ([⅕]*[228.9/0.05]). However, with four cure zones such as shown in FIG. 12B the build time is cut to 25% (approximately 3.8 hours). Depending on the build material additional cure zones can be added to further reduce the build time.

The method described herein of rotating the build platform allows for a larger surface area to be exposed to the electromagnetic radiation used to solidify the deposited photocurable materials resulting in constructing of objects that are larger than the physical dimensions of individual solidification areas, thus allowing the construction of larger objects. By utilizing a small area for solidification, higher resolutions and power densities can be attained by concentrating the number of solidification points to a smaller and denser region, which through rotation, can irradiate entire portions of the build area. This reduced solidification area also results in a greater concentration of radiation to targeted areas which helps to provide a close to instantaneous cure of construction materials, yielding faster construction of an object.

The method of curing or otherwise solidifying material between a build platform and another substrate yields greater layer height uniformity, accuracy and consistency. This method also helps prevent errors during layer creation that can result from external factors such as vibration that might have otherwise disturbed materials that were not held in place between two substrates. This translates to greater reliability of the machine with particular benefits in constructing small, ultra high resolution, components so that they can be prevented from being deformed or distorted by internal or external disturbances on the 3D build device.

The problem of part delamination seen in many prior 3D build systems can be caused by forming successive individual layers of material which are inherently structurally weak along their horizontal axis's (i.e., where subsequent layers are in contact). The combined action of forcibly and repeatedly separating the solidified material from a vat floor and inadequate adhesion between layers can result in one or more layers separating causing a failed structure build. In particular, objects that contain dramatic changes in areas of increased solidification can result in fracturing of structurally weak areas that or in highly dense regions of solidified material due to the inability of the structures to provide adequate support and structural integrity and external forces applied to it during the construction process. Increasing the build area in these locations can further exacerbate the problems described above and result in greater risk for printed object fractures via delamination. The process and devices described herein provide reduced surface adhesion between solidified materials and the transparent build and as a result preserve the integrity of delicate geometries that are constructed and enhance the ability to use speeds in the construction process.

Methods incorporating features of the present invention including selectively solidifying the construction material in a relatively small area comparable to the total construction area serve to reduce adhesion forces by minimizing the physical area that generates the adhesion. The rotational motion of the build platform serves to continually remove this adhesion force as it forms preventing adhesion force accumulation. This allows for the construction of a large area with only a small portion of the constructible area ever being subject to the adhesion of material to the substrate at any given time. The transparent substrate be composed of or being treated with non-stick materials, further reduces the effects of adhesion.

Methods which incorporate features of the present invention include rotating the build platform about and above the solidification areas, providing for an innovative method for separating cured materials from a build substrate. The circular motion generated by the rotating build platform provides a superior separation method that reduces damage to newly solidified material because less force is needed to separate or slide the solidified material off the transparent build substrate and less force is applied to the constructed part. This allows the construction of very delicate geometries that can be unsupported, small, tall, thin or isolated and that could otherwise have been damaged in the separation processes of prior art 3D build systems. The method for continuous or semi continuous construction utilizing a rotating mechanism for dispensing and solidifying of photocurable material against a build platform that gradually moves upward along a z-axis results in the creation of at least one continuous spiral or helical shaped layer. This spiral buildup of material results in the formation of an objects with superior layer-to-layer strength characteristics which aides in diminishing the chance for part delamination and results in lower occurrences of failed structures.

The inverted construction process provides several benefits. In several prior art systems an object is built on a platform with a first layer on the platform and subsequent layers are added on top of the prior layers. While some prior systems may use an inverted build, in the present inverted build system, a first layer is continuously applied to a build platform and solidified. However, the first layer is also continuously removed as a solid layer from the build platform during the build process and new material is fed between the first layer and the build platform so as to adhere to the rising prior layer while being continuously removed from the build platform. It allows for solidification of a large area with a relatively shallow layer of material needed, allowing for less material being used during the process compared to the amount of material needed to fill an entire vat. The vertical and inverted construction process utilizes gravity to drain excess material from previously solidified regions. The ability to form hollow cavities within the structure is very beneficial with regards to materials savings, and producing of objects with internal geometries. The use of a material stripper and drain help to further remove excess material for recycling, thus improving the economy of the machine and preventing the unintentional curing of excess material which can allow production an object that more closely resembles an intended product and has sharper details.

The method of utilizing rotational movement for construction, instead of lateral back and forth motion, as referred as oscillation, provides for increased scalability of the machine. Unlike oscillation, rotational elements that are in continuous motion in one direction do not have compensate for momentum resulting from the oscillating movement. Therefore, a machine that utilizes the described rotational technique can comprise larger and heavier components that would otherwise have significant negative impact on the construction process and operational speed. In this rotational method of construction speed is independent of construction volume. Increasing the size of the construction mechanism and the build platform will result in a greater possible build volume, translating to comparatively faster construction from a given volume of material.

Embodiments of the invention are described herein with reference to different views and schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein but are contemplated to include deviations in shapes that result, for example, from manufacturing.

While devices, systems and methods incorporating features of the present invention are primarily directed to stereolithographic processes using liquid-based building materials. The techniques of the present invention can have application using other flowable materials and appropriate solidification technologies such as selective laser sintering (SLS), for the purposes of enhancing resolution, faster construction times, economic material use and the ability to form hollow cavities in a constructed object that would otherwise be filled with excess construction materials. Such an embodiment can utilize heated construction materials which are then solidified. The use of a laser diode that emits radiation in the infrared spectrum a construction substrate also transparent to infrared radiation. Thermal and atmospherically control over the material and build chamber 21 is desirable for greater control over the reacting materials in the construction process.

Sintered materials such as metals or powdered polymers can be used with the above process along with a heating and/or radiation source for thermal heating and/or fusing of material. Main differences from the above recited processes can be the possible addition of an atmospheric control system that would fill the build chamber 21 with an inert gas like argon or nitrogen and a thermal control system like infrared heaters. Laser beams can be used to melt and fuse the construction material.

Flowable sinterable materials or additives can also be used as, or as part of, the construction material. The sinterable materials can then be bound in place by the curing of surrounding photopolymers or the melting or binding of a powdered polymers resulting in production of a "green object." This green object then requires the additional steps for converting the green object to create higher part densities, known as post furnace processing which can include debinding which comprises placing the part in a furnace at a temperature that vaporizes or carbonized the binding material and promotes a controlled shrinkage or necking of the green build material to hold its shape while forming a solid structure.

Infiltration, which is a process for infusing the formed solid but porous part with another material, filling in the porous voids in the part. This infused material can have a lower melting point then the main construction material. An example of one such material suitable for infiltration is copper. Molten copper can diffuse into iron powder particles creating swelling. By controlling the copper concentration, it is possible to offset the natural shrinkage of iron during sintering to help preserve part dimensions of the green object. Such a process can also be used to form structures from bio-compatible materials which can then be infused with other biomaterials to form biologically compatible implant structures.

Consolidation is a process which can occur during sintering, results in the product shrinking so as to increase the part density.

With the inclusion of a laser of sufficient power, direct thermal sintering of the construction materials or a concentration of additives contained in a dispensed formulation whose components are capable of fusion to each other and the build platform is possible. This embodiment needs greater thermal control of the material and build chamber 21 as well as a means for regulating the atmosphere which would utilize blanketing of the solidification area with inert gases such as nitrogen and argon and a method for removing any gaseous byproducts.

Examples of sinterable additives are: 17-4 and 15-5 stainless steel, maraging steel, cobalt chromium, Inconel 625 and 718, titanium Ti6Alv4, titanium Ti64, Cobalt Chrome Alloy Co28Cr6Mo, Nickel Alloy In718 Theoretically, almost any alloy metal can be used in this process. Sintering typically involves induced binding, liquid phase sintering and/or full melting. These techniques are known in the art.

Figure 19:
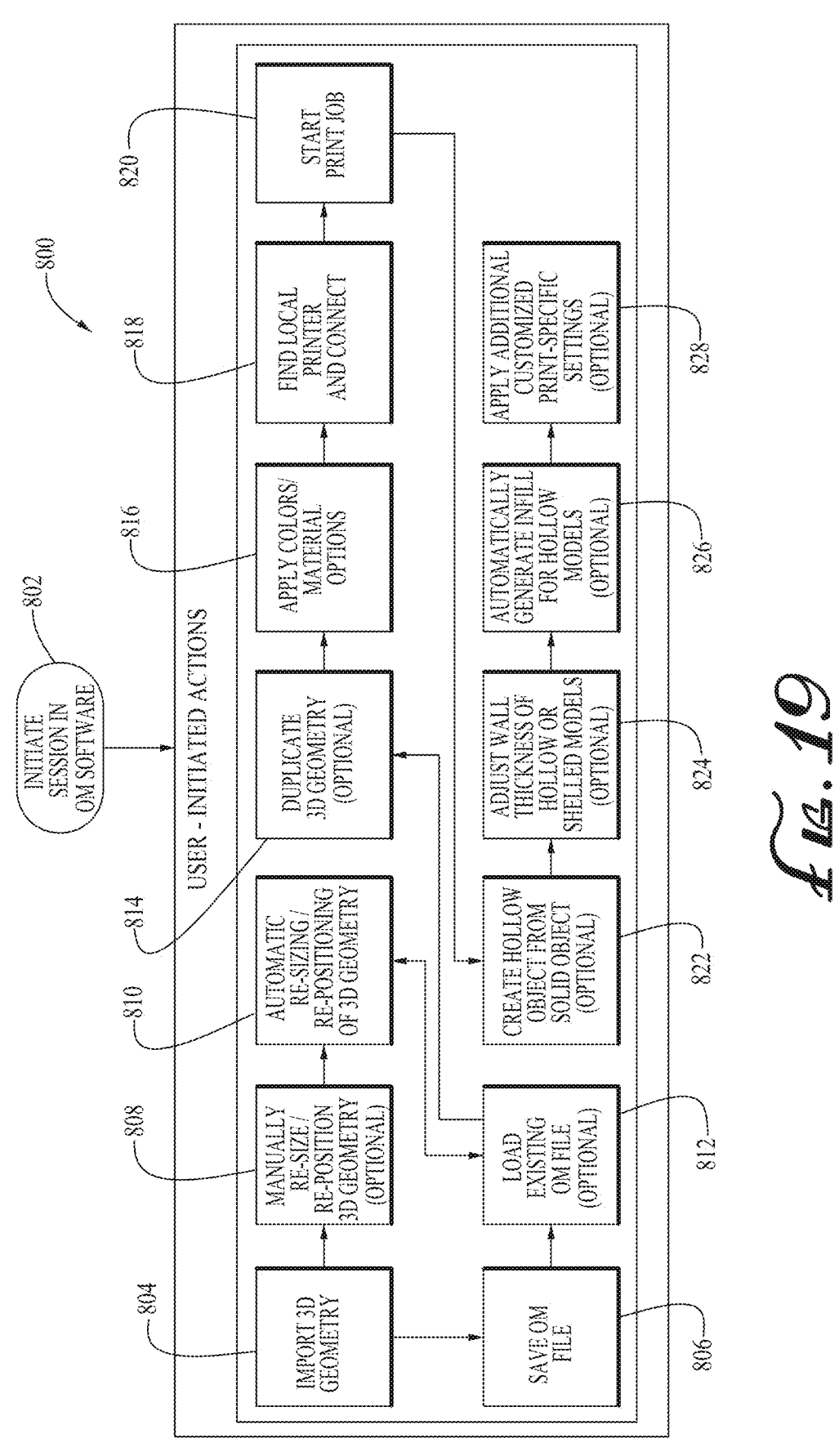
FIG. 19 is a process flow diagram for a specific embodiment for a product buildup using the 3D printer device shown and described herein.
Figures 20, 21:
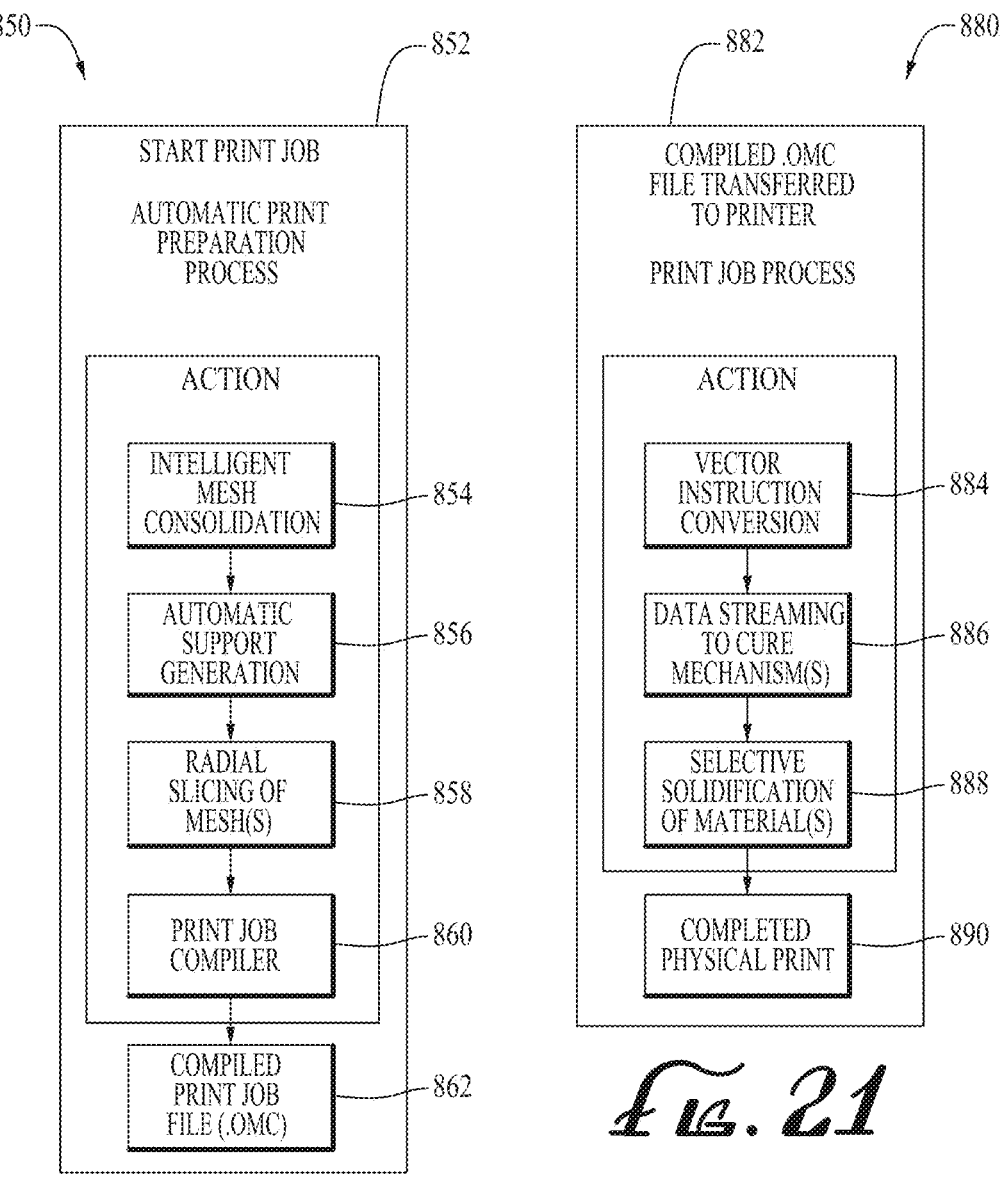
FIG. 20 is a process flow diagram for a specific embodiment for a product buildup using the 3D printer device shown and described herein.
FIG. 21 is a process flow diagram for a specific embodiment for a product buildup using the 3D printer device shown and described herein.

FIGS. 19-21 show a process flow diagram, which can incorporate computer software, for utilizing 3D printing devices incorporating features of the present invention. Regarding FIG. 19, which shows a user-initiated process 800, the session is started in an initiation step 802, which can include the initiation of software, such as OM (an Omicron Compiler File) software or other suitable software. A user can engage in and initiate a series of interrelated user actions. For example, a use can activate an import step 804, wherein the user imports 3D geometry, for example, from existing data or from recently scanned data. From this step, the user can elect to initiate a save step 806, in which the user can save the 3D geometry data, for example, an .OM software file. Alternatively, or in addition to initiating a save step 806, a user can initiate a manual re-size/reposition step 808 of the imported 3D geometry data. The 3D geometry data can then be automatically re-sized/repositioned in an automated adjustment step 810.

At any point, an existing file, for example, an existing .OM file saved in the save step 806 or a manually and automatically adjusted file from the manual and automatic adjustment steps 808, 810 can be loaded into the memory of a user interface in a load step 812. From the load step 812, several additional steps can be initiated. For example, a user can initiate a duplication step 814, wherein one or more aspects of the 3D geometry data can be duplicated. A user can then initiate an application step 816, wherein a user can alter and/or apply colors and other material options to the 3D geometric data. The user can then initiate a connection step 818, wherein the user can locate a local 3D printer and connect, after which the user can initiate a print step 820, wherein the 3D object begins to print.

During the setup process and compiling the print instructions for printing the 3D object in the print step 820, instructions can be provided to produce a solid or a hollow structure and additional steps can be initiated to further define the object. A user can initiate a hollowing step 822, whereby a hollow object is produced instead from, and instead of, an existing solid object. A user can then initiate a hollowness adjustment step 824, whereby the wall thickness of hollow or shelled products can be adjusted. An automated infill step 826 can also be initiated, wherein infill for hollow models is automatically generated. Finally, a user can initiate a customization step 828, wherein additional customized print-specific settings are applied to the 3D object.

It is understood that while the examples cited above specifically refer to .OM files, other software file formats can be utilized. For example, users can import 3D models formatted as AMF, STL, PLY<OBJ, or any other similar file known in the art. Support for auto-detecting colors and/or materials can be included. Each piece of unique imported 3D geometry data can be stored along with the transformation matrix (applied from the origin) and metadata describing color and material selections.

Referring now to FIG. 20, which shows a further process flow diagram 850 incorporating features of the present invention, an automated print preparation (scan) process 852 is initiated by the user or in response to a stimulus, for example, the printer being powered on or receiving a connection signal from a computer or other user interface. In a first step 854, intelligent mesh consolidation of an object being reproduced takes place. In some embodiments, an algorithm is utilized to consolidate all meshes in preparation for slicing. This first step 854 can be used in the production of separate combined meshes each organized by color and material. In a second step 856, the algorithm can, if necessary, automatically generate and add any support structures needed for each combined mesh. In a third step 858, radial slicing of the mesh can occur. In this step 858 one or more algorithms can radially slice the input mesh and produce encoded vector data describing the intended structure to be printed in real-world dimensions utilizing real-world units. This data can be stored and later compiled to machine-specific instructions. Layer height is taken into account at this stage and can be pre-set as a constant value for the entire print or vary throughout the print.

In a fourth step 860, the print job is compiled by one or more algorithms to produce a single compiled (machine-specific) print job file containing all the print information utilized by the printer. In a fifth step 862, this compiled print job file, which can be machine specific and can be in .OM format, is transferred to the printer.

Referring now to FIG. 21, which shows an example of a process flow 880 after a step 882 wherein the print-job file is compiled and transferred to a printer (which can be a continuation of the fifth step 862 in FIG. 20 or proceed directly from a loaded externally or independent provided print file). In a first step 884, an algorithm translates vector instructions from real-world units into a binary arrangement (arrays of individual ones and zeroes) that is used by the printer. In a second step 886, the print processor of the printer streams data bits to the curing mechanism at a hardware-synchronized rate that coincides with the motor/mirror movement. In a third step 888, the actual heliography (curing) process occurs, utilizing continuous computer-controlled selective solidification. In a fourth step 890, a completed physical object mirroring the virtual 3D geometry is produced.

The present disclosure will now set forth various configurations utilizing VCSEL light sources, which have several distinct advantages. Various 3D printing techniques are based on photo-initiation from direct-emitted, single-transverse mode that is focused to a small spot of 1-100 microns diameter to locally start the polymerization process. The energy is absorbed by a photoinitiator, typically but not limited to an organic molecule that absorbs efficiently at the wavelength of interest to create free radicals, which then catalyzes the rest of the reaction—propagation steps, cross-linking and subsequent termination. Different photoinitiators may require different wavelengths of excitation for efficient initiation to take place. This requires a serial solidification process and limits the amount of energy that can be delivered precisely.

3D printing techniques including polymerization of liquid pre-polymer systems, sintering of powder materials, powder w/curable binder, polyjet technologies, etc have been around for several decades, reaching limitations of scalability. Limiting factors for scaling include the amount of material that can be solidified at any given point in time, which is coupled to the amount of energy that can be delivered in precise quantity, usually done with a point source that is scanned. With this approach, print speed is inversely proportional to complexity because the spot size must be scanned serially point-to-point to cover all areas of the current layer.

Some systems use Digital Micromirror Device (DMD) chips consisting of rectilinear arrays of tiltable mirrors, to expose a plane of pixels at once. This accomplishes parallelization of cure and the entire layer can be exposed in the same amount of time regardless of the specific cross section—however, the energy density delivered to the cure area is an inverse square function, with energy decreasing as the square root of the build area. In practicality, this combined with the power handling limitations of the DMD chip, limits the size of the cure area that can be exposed in a single image without requiring excessively long layer exposure times.

In contrast, the disclosed VCSEL configurations accomplishes both parallelization of cure and infinitely scalable energy input by utilizing arrays of semiconductor by utilizing VCSELs to precisely direct energy into the cure area, pixel-for-voxel. These VCSEL arrays are built using standard semiconductor batch manufacturing and processing techniques, and represent significant advancements in light engine scalability, reliability, and ease of processing, when compared to conventional edge-emitting laser systems. Additionally, the light is directly coupled in preferably a 1:1 magnification ratio (or other) from the chip into the cure zone, and as a result does not require complex optical systems to project light from a small source to a large area. The resulting system is extremely compact and optomechanically simplified.

Most solid-state lasers are edge-emitting structure variety, which are not conducive to assembling large linear areas due to the corresponding difficulties of cleaving and assembly. In contrast, VCSELs can be grown in an array of any size, shape, and quantity on a single die, tested on the die, and then diced into individual chip "tiles" which can then be assembled together to provide a seamless (100% fill factor) linear array of arbitrary size. Semiconductor lasers comprise layers of semiconductor material grown on top of each other on a substrate (the "epi"). For VCSELs and edge-emitters, this growth is typically done in a molecular-beam-epitaxy (MBE) or metal-organic-chemical-vapor-deposition (MOCVD) growth reactor. The grown wafer is then processed accordingly to produce individual devices.

VCSELs, however, are semiconductor lasers, more specifically laser diodes with a monolithic laser resonator, where the emitted light leaves the device in a direction perpendicular to the chip surface. The resonator (cavity) is realized with two semiconductor Bragg mirrors (→distributed Bragg reflector lasers). Between those, there is an active region (gain structure) with (typically) several quantum wells and a total thickness of only a few micrometers. In most cases, the active region is electrically pumped with a few tens of milliwatts and generates an output power in the range from 0.5-5.0 mW, or higher powers for multimode devices. The current is often applied through a ring electrode, through which the output beam can be extracted, and the current is confined to the region of the resonator mode using electrically conductive (doped) mirror layers with isolating material around them. In a VCSEL, the active layer is sandwiched between two highly reflective mirrors (distributed Bragg reflectors, or DBRs) made up of several quarter-wavelength thick layers of semiconductors of alternating high and low refractive index. The reflectivity of these mirrors is typically in the range 99.5-99.9%. As a result, the light oscillates perpendicular to the layers and escapes through the top (or bottom) of the device. Current and/or optical confinement is typically achieved through either selective oxidation of an Aluminum-rich layer, ion-implantation, or even both for certain applications. The VCSELs can be designed for "top-emission" (at the epi/air interface) or "bottom-emission" (through the transparent substrate) in cases where "junction-down" soldering is required for more efficient heat-sinking for example.

In contrast, edge-emitters are made up of cleaved bars diced from the wafers. Because of the high index of refraction contrast between air and the semiconductor material, the two cleaved facets act as mirrors. Hence, in the case of an edge-emitter, the light oscillates parallel to the layers and escapes side-ways. This simple structural difference between the VCSEL and the edge-emitter has important implications.

Since VCSELs are grown, processed and tested while still in the wafer form, there is significant economy of scale resulting from the ability to conduct parallel device processing, whereby equipment utilization and yields are maximized and set up times and labor content are minimized. In the case of a VCSEL (see FIG. 1), the mirrors and active region are sequentially stacked along the Y axis during epitaxial growth. The VCSEL wafer then goes through etching and metallization steps to form the electrical contacts. At this point the wafer goes to test where individual laser devices are characterized on a pass-fail basis. Finally, the wafer is diced and the lasers are binned for either higher-level assembly (typically >95%) or scrap (typically <5%).

In a simple Fabry-Perot edge-emitter, the growth process also occurs along the Y axis, but only to create the active region as mirror coatings are later applied along the Z axis. After epitaxial growth, the wafer goes through the metallization step and is subsequently cleaved along the X axis, forming a series of wafer strips. The wafer strips are then stacked and mounted into a coating fixture. The Z axis edges of the wafer strips are then coated to form the device mirrors. This coating is a critical processing step for edge emitters, as any coating imperfection will result in early and catastrophic failure of the devices due to catastrophic-optical-damage (COD). After this coating step, the wafer strips are diced to form discrete laser chips, which are then mounted onto carriers. Finally, the laser devices go into test.

It is also important to understand that VCSELs consume less material: in the case of a 3" wafer, a laser manufacturer can build about 15,000 VCSEL devices or approximately 4,000 edge-emitters of similar power levels. In addition to these advantages, VCSEL also demonstrate excellent dynamic performances such as low threshold currents (a few micro-amps), low noise operation and high-speed digital modulation (10 Gb/s). Furthermore, although VCSELs have been confined to low-power applications—a few milli-Watts at most—they have the inherent potential of producing very high powers by processing large 2-D arrays. A 2-D VCSEL array with several thousand emitters can emit several hundred watts of total optical power. In contrast, edge-emitters cannot be processed in 2-D arrays.

An important practical advantage of VCSELs, as compared with edge-emitting semiconductor lasers, is that they can be tested and characterized directly after growth, i.e. before the wafer is cleaved. This makes it possible to identify quality problems early on, and to react immediately. Furthermore, it is possible to combine a VCSEL wafer with an array of optical elements (e.g. collimation lenses) and then dice this composite wafer instead of mounting the optical elements individually for every VCSEL. This allows for cheap mass production of laser products. Feature of VCSELs is the long lifetime, as there is no facet which can be damaged by high optical intensities.

Unlike conventional semiconductor lasers, which emit from the side, VCSELs emit from the surface, which allows on-wafer testing arrays of devices. This provides many advantages. The lasing wavelength in a VCSEL is very stable, since it is fixed by the short (1~1.5-wavelength thick) Fabry-Perot cavity. Contrary to edge-emitters, VCSELs can only operate in a single longitudinal mode. Growth technology has improved such that VCSEL 3" wafers are produced with less then a 2 nm standard deviation for the cavity wavelength. This allows for the fabrication of VCSEL 2-D arrays with little wavelength variation between the elements of the array (<1 nm full-width half-maximum spectral width). By contrast, edge-emitter bar-stacks suffer from significant wavelength variations from bar to bar since there is no intrinsic mechanism to stabilize the wavelength, resulting in a wide spectral width (3~5 nm FWHM). The emission wavelength in VCSELs is ~5 times less sensitive to temperature variations than in edge-emitters. The reason is that in VCSELs, the lasing wavelength is defined by the optical thickness of the single longitudinal-mode-cavity and that the temperature dependence of this optical thickness is minimal (the refractive index and physical thickness of the cavity have a weak dependence on temperature). On the other hand, the lasing wavelength in edge-emitters is defined by the peak-gain wavelength, which has a much stronger dependence on temperature. As a consequence, the spectral line-width for high-power arrays (where heating and temperature gradients can be significant) is much narrower in VCSEL arrays than in edge-emitter-arrays (bar-stacks). Also, over a 20 degree Celsius change in temperature, the emission wavelength in a VCSEL will vary by less than 1.4 nm (compared to ~7 nm for edge-emitters).

Additional advantages provided by utilizing VCSEL configurations over edge-emitters include that because VCSELs can operate reliably at temperatures up to 80 degrees Celsius, they can be operated without refrigeration. Thus, the cooling system becomes very small, rugged and portable with this approach. Edge emitters deliver a maximum of about 500 W/cm2 because of the gap between bar to bar which has to be maintained for coolant flow, while VCSELs are delivering ~1200 W/cm2 now and can deliver 2-4 kW/cm2 in the near future. VCSELs emit a circular beam. Through proper cavity design VCSELs can also emit in a single transverse mode (circular Gaussian). This simple beam structure greatly reduces the complexity and cost of coupling/beam-shaping optics (compared to edge-emitters) and increases the coupling efficiency to the fiber or pumped medium. This has been a key selling point for the VCSEL technology in low-power markets. Because VCSELs are not subject to catastrophic optical damage (COD), their reliability is much higher than for edge-emitters. Typical FIT values (failures in one billion device-hours) for VCSELs are less than 10. VCSEL do not have the failure mode of traditional edge emitting diodes such as line defects.

Manufacturability of VCSELs has been a key selling point for this technology. Because of complex manufacturing processes and reliability issue related to COD (catastrophic optical damage), edge-emitters have a low yield (edge-emitter 980 nm pump chip manufacturers typically only get ~500 chips out of a 2" wafer). On the other hand, yields for VCSELs exceed 90% (corresponds to 5000 high-power chips from a 2" wafer). In fact, because of its planar attributes, VCSEL manufacturing is identical to standard IC Silicon processing. Enables the use of traditional semiconductor manufacturing equipment to keep fabrication costs down. This also allows for good integration ability, as VCSEL are compatible with detectors and other circuitry. VCSELs can also be tested and burned in while still in wafer form, which increases the manufacturing yield and lowers cost. For high-power applications, a key advantage of VCSELs is that they can be directly processed into monolithic 2-D arrays, whereas this is not possible for edge emitters (only 1-D monolithic arrays are possible). In addition, a complex and thermally inefficient mounting scheme is required to mount edge-emitter bars in stacks. Mounting of large high-power VCSEL 2-D arrays in a "junction-down" configuration is straightforward (similar to microprocessor packaging), making the heat-removal process very efficient, as the heat has to traverse only a few microns of AlGaAs material. Record thermal impedances of <0.16K/W have been demonstrated for 5 mm×5 mm 2-D VCSEL arrays. With the simple processing and heat-sinking technology, it becomes much easier to package 2-D VCSEL arrays than an equivalent edge-emitter bar-stack. The established existing silicon industry heat-sinking technology can be used for heat removal for very high power arrays. This will significantly reduce the cost of the high-power module. Currently, cost of the laser bars is the dominant cost for the DPSS lasers.

The most common emission wavelengths of VCSELs are in the range of 750-980 nm (often around 850 nm), as obtained with the GaAs/AlGaAs material system. However, longer wavelengths of e.g. 1.3, 1.55 or even beyond 2 μm can be obtained with dilute nitrides (GaInNAs quantum wells on GaAs) and from devices based on indium phosphide (InAlGaAsP on InP). The use of these wavelengths can be employed to thermal cure, sinter, melt, or cause photo curing with appropriate photoinitiators that produce free radicals in those wavelengths. Harmonic Generation via crystal nonlinear processes can create other shorter wavelengths that otherwise may not be produced directly from the semiconductor. Using nonlinear crystals such as KTP, MgO, PPLN, etc conversion is proportional to intensity and the crystal structure allows, via varying periodicity of phase within crystal, tuning of the optical resonance of the crystal to achieve different output wavelengths. For a given VCSEL, simply changing the nonlinear crystal can change the output wavelength. For example, an 808 nm source could be doubled into a 404 nm output, or tripled into a 269 nm output, etc., simply by changing the crystal material, or a 976 nm source could be doubled to 488 nm. Other solid-state direct-emissive sources such as microLED are limited in power and beam quality or coherent output capability. MicroLEDs typically will have a lambertian intensity distribution from the emitting surfaces, which need collecting and focusing options with high NA to gather light and direct a small spot into the system. VCSEL lasers represent a much closer realization to a perfect point source and can be efficiently collimated and focused to a small spot size without requiring expensive (high-NA/high collection) optical systems.

In addition to the high beam quality of low-power VCSELs, an important aspect is the low beam divergence, compared with that of edge-emitting laser diodes, and the symmetric beam profile. This makes it easy to collimate the output beam with a simple lens, which does not have to have a very high numerical aperture. Due to the fact that the VCSEL sources are much closer to an ideal light source, relatively inexpensive optics (microlens arrays or equivalent) with equivalent center-to-center pitch placed over top of the VCSEL emitter die can be used to create the proper focused spot.

Figures 23A, 23B:
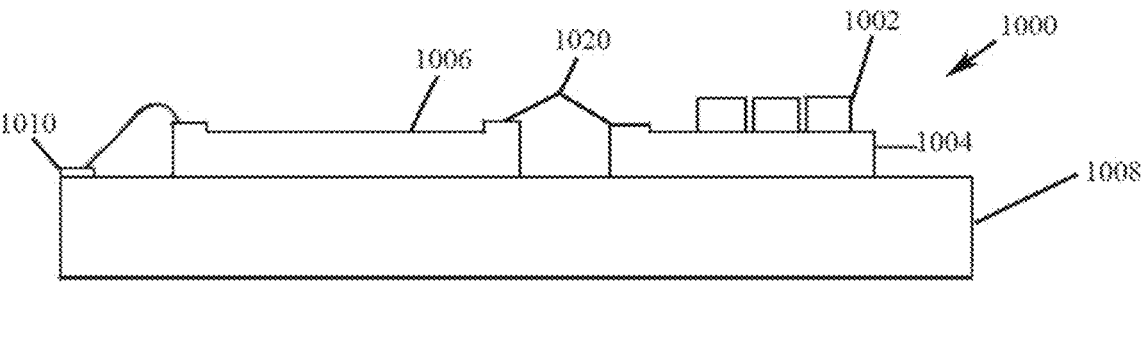
FIG. 23A shows a front sectional view of a first VCSEL chip configuration embodiment incorporating features of the present invention.
FIG. 23B shows a front sectional view of a second VCSEL chip configuration embodiment incorporating features of the present invention.

Specific embodiments utilizing VCSEL configurations integrated into 3D printing systems will now be described. Each of these light sources can be utilized and integrated into 3D printing systems, including any of the 3D printing systems disclosed herein and can replace the light sources disclosed above. FIGS. 23A-B show a chip-level sectional view of example configurations between chip-level the VCSEL light sources and the control drivers. FIGS. 23A and 23B show a VCSEL chip 1000 comprising one or more VCSEL emitters 1002 (three shown) on a common substrate 1004. A control driver 1006 is external to but communicatively coupled to the VSCEL chip 1000. Both the VSCEL chip 1000 and the control driver 1006 are bonded to a common heat spreading substrate 1008. In both FIG. 23A and FIG. 23B, the control driver 1006 is external to, and not in direct physical contact with, the VCSEL chip 1000. In FIG. 23A, the control driver 1006 is electrically communicatively coupled to both a contact 1010 by one or more wire bonds 1020 (two shown). In FIG. 23B, the control driver 1006 is electrically communicatively coupled to both a contact 1010 by one or more conductive bridges 1030 (one shown). Specific driver configurations are described in greater detail further herein.

FIGS. 24A-24B show a chip-level sectional view of example configurations between the VCSEL light sources and the control drivers. FIGS. 24A and 24B show a VCSEL chip 1100 comprising one or more VCSEL emitters 1102 (three shown) on a common substrate 1104. A control driver 1106 is communicatively coupled to the VSCEL chip 1100. Both the VSCEL chip 1100. The VCSEL chips 1100 are in thermal communication with a heat spreading substrate 1108. In contrast with FIG. 23A and FIG. 23B, the control driver2 1106 are in direct physical contact with the VCSEL chips 1100. In FIG. 24A, the control driver 1006 is stacked with the VCSEL chip 1100. In FIG. 24B, the control driver 1106 is integrated into the substrate 1104. The integrated monolithic driver 1106 of FIG. 24B provided a cost-effective integrated package.

Using VCSEL technology, a driver can be either external (e.g. CMOS ASIC) or can be integrated directly into the GaAs wafer for a completely monolithic structure. The latter offers benefits in terms of integration flexibility, reduced cost, fewer interconnects, increased reliability. Temperature sensing junctions could also be integrated into the die to allow precise feedback and control of the emitter temperature—for precise wavelength tuning/stabilization. This has applications for ensuring efficient second harmonic generation (SHG) processes. Other benefits of temp sensing junctions placed sparsely along the array include the ability to closely monitor and control emitters. Ability to overdrive specific emitters or emitter groups without negatively affecting the chip as a whole.

In some embodiments, each of the numerous emitters on the VCSEL chip is addressed individually channel-for-channel through direct connection to a configurable Complementary metal-oxide-semiconductor (CMOS) application specific integrated circuit (ASIC) driver chip functioning as a specialized n-channel constant-current input/output (I/O) expander, which is controlled via serial low-voltage differential signaling (LVDS) from the main system field-programmable gate array (FPGA). The CMOS driver chip provides the main FPGA an interface to control each channel with 10-bit control of current and 10-bit control of the duration of that current, yielding a total of 20 bits of exposure control per channel.

Figure 25:
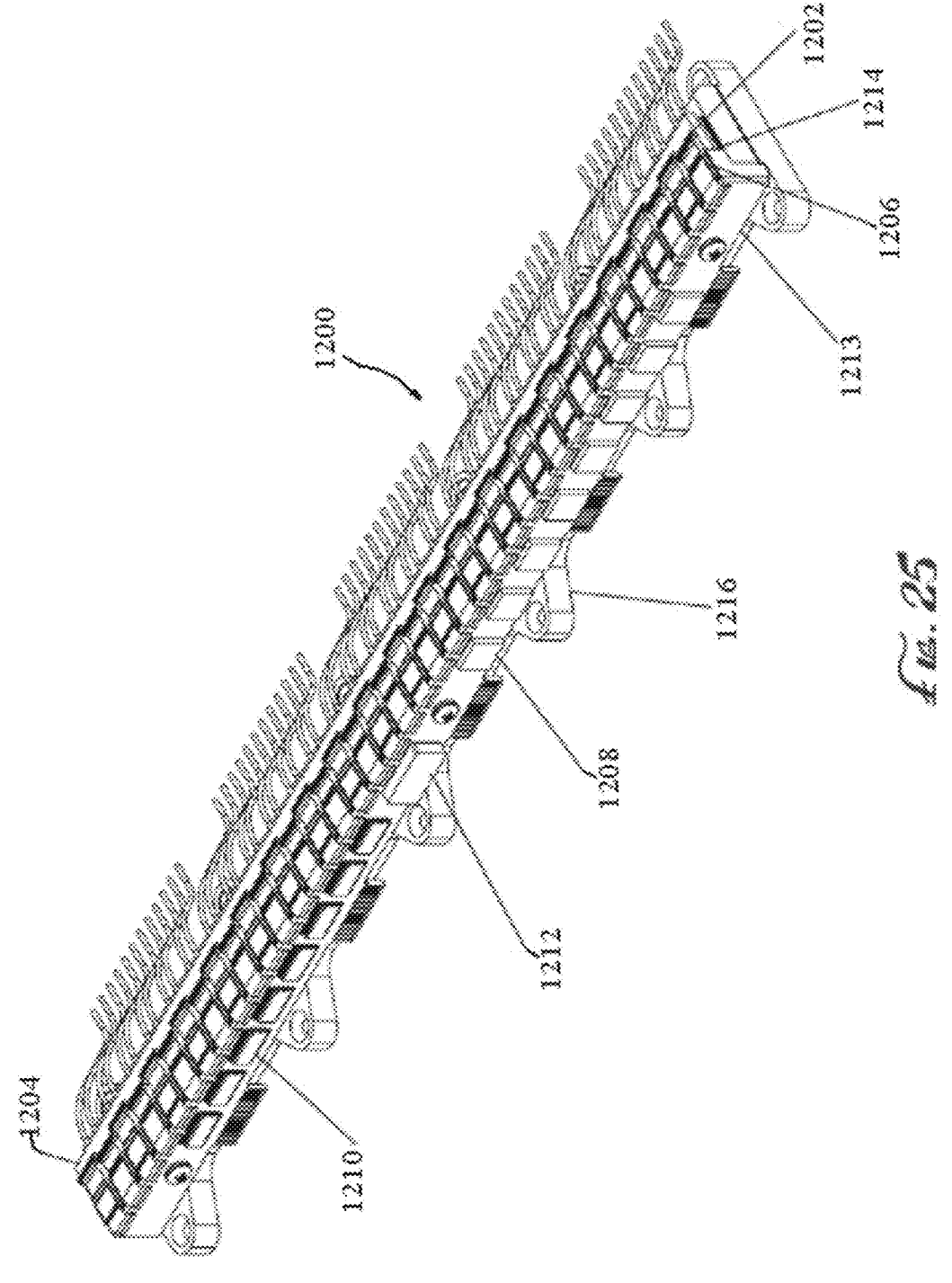
FIG. 25 shows a front perspective view of an embodiment of a print head with an integrated VCSEL array incorporating features of the present invention.

FIG. 25 shows a print head 1200, with one or more VCELs 1202 arranged thereon (a plurality in array shown). In the embodiment shown in FIG. 25, the VSCELs are arranged in a staggered array. The print head 1200 can comprise similar structure, materials and configuration as any of the materials dispensers 180, 184 described earlier herein. The print head 1200 can further comprise a VSCEL substrate 1204, which can be similar to the substrates 1004, 1104 described above with reference to FIGS. 23-24. The print head 1200 can further comprise VSCEL drivers 1206, similar to the VSCEL drivers 1006, 1106 described above with reference to FIGS. 23-24, which can be near and communicatively connected to the VSCELS 1202. The print head 1200 can also comprise memory, with the embodiment shown comprising driver random access memory (RAM) 1208 and flash memory 1210. The print head 1200 can also comprise an FPGA 1212 to provide further control over the VCSEL functions. The memory and processing components of the print head 1200 can be integrated into a print head printed circuit board (PCB).

VCSEL chips in an array may be staged from one another, for example, as shown in FIG. 25, and/or individual VCSEL emitters within the chips can be staggered from one another. The stagger of the VCSEL chips and emitters can be designed and optimized for factors such as, designed optics, emitter size and energy, fill factor, optical system, spot size, cooling, tiling strategies, overcoming dead or inactive emitters. Alternatively, the VCSEL chips can be configured in a non-staggered or linear array.

The print head 1200 in FIG. 25 can also comprise cooling elements, which are useful to provide cooling when a high-powered VSCEL array is utilized as a curing system. Some cooling elements the print head 1200 can comprise include a thermoelectric cooler (TEC) 1214, for example, a Peltier cooler, and thermal conduction modules 1216, which can sense temperature changes and electrically communicate with drivers controlling the TEC 1214. In the embodiment shown in FIG. 25, heat that is generated in the VSCEL emitter zone can be drawn through the VSCEL substrate 1204 and into a heatsinking mechanism. Some example heatsinking mechanisms include, for example, microchannel plates, peltier coolers, air heat exchanger, or other heatsinking methods. As discussed above, the TEC 1214 is the heatsinking mechanism utilized in the embodiment of FIG. 25.

Heat loads on the print head 1200 are time-varying and print-specific. For example, a single emitter or 1,000 emitters could be active at any given moment to replicate a portion of data in physically cured polymer. Precise knowledge of local temperature allows optimization of print speed for a given object. The thermal management system is able to respond to changing heat loads on a timescale sufficient to ensure the junction temperature of the VCSEL chips 1202 stays within a narrow temperature window during operation to ensure stable wavelength and efficient SHG. The CMOS ASIC drivers have a more relaxed thermal operating window, requiring the junction temperature to remain below 125 C.

Utilizing a TEC to reduce the time constant of the cooling feedback loop allows the system to respond much faster to varying heat loads electrically and maintain a constant chip temperature. A general model of the system can be constructed, and used at run-time in conjunction with queued array data and a heat transfer function of the VCSEL emitter to feed-forward thermal control into the closed-loop system and help achieve tight response times.

This means that the system is not as reliant on the coolant loop to maintain the proper temperature—only to remove heat from the system in whatever quantity it is present at the hot end of the TEC. In order to minimize thermal resistance across the system and maximize thermal control loop response times, the number of thermal interfaces between emitter and ultimate heat removal is kept to an absolute minimum. Each thermal interface is joined with high-quality thermal paste or epoxy, which in some embodiments, comprises a layer that is 0.001" or thinner. A further benefit of the TEC-based system is the ability to pre-heat the VCSEL chips to 75 degrees Celsius for optimally-efficient SHG when first starting a print. Tight real-time control over heat flow through the system—VCSEL junction temperature should ideally be controlled to within under 5 degrees Kelvin. Care must be taken with placement of the temperature sensors to ensure accurate feedback. In some embodiments, temperature sensing junctions should be integrated directly into the VCSEL die for maximally-accurate feedback.

FIG. 26 shows the print head 1200 of FIG. 25 integrated into a rotatable print head platform structure 1300. The rotatable print head platform structure 1300 can comprise a print head main printed circuit board (PCB) 1302, which is coupled to the print head 1200, a main random-access memory 1304, a microprocessor 1306, a secondary controller 1308 (for example, a Flexray® controller), and a TEC controller PCB 1310 coupled to one or more TEC controllers 1312. Each of these structures can be mounted to a fixed base 1314, which can be configured with the above features to form a rotatable configuration utilizing a rotation motor 1316 and a rotary table 1318.

The rotation motor 1316 and the rotary table 1318 can comprise a rotational configuration similar to that of the build platform 16 herein. The resulting rotating VCSEL array provides necessary energy density at simultaneous point on a radial in a rotary system to induce close to instantaneous solidification of material, allowing for faster printing and the ability to solidify a greater range of materials with higher energy levels to induce a phase change. The print head 1200 on the separate rotary scanning system exposes larger areas, or increases the print speed of the system without increasing the rotational speed of the rotating build plate (described above). This allows the speed of rotation of the build plate to be optimized for adhesion removal, material distribution, or other factors without sacrificing print speed. This also allows for greater energy VCSELS to be used where if high enough energies were attained beyond the optimized build plate speed this energy can now be utilized through rotational scanning. A rotating light source also removes the need to have multiple fixed position polyaryl arranged arrays, which reduces cost of the machine and increase the number of possible cure zone areas as the position of the rotating light source is now configurable. Allows for printing in continuous and semi-continuous motion where some materials may have a longer cure reaction necessary for the build plate to be stationary before it moves.

It is important to note that while the present disclosure focuses on a rotating build plate and a rotating radiation source in the form of the VCSEL array, the rotating radiation sources disclosed here can be utilized in 3D printing systems without a rotating build platform, for example, stationary build plates. Furthermore, the rotating radiation source and the rotating build plate can be controlled separately or together and can comprise their own associated drivers. In some embodiments, the rotating radiation source and the rotating build plate can be configured to have different characteristics including rotational and angle characteristics and/or different speeds.

A rotating light source also opens up the option for various cure zone geometries as shapes to be used rather than simple pie shapes or radials. Individual islands or different vats with different cure zone geometries optimized for different materials with consideration of fluid dynamics based on viscosity or particle size, adhesion characteristics, Allows for greater variety of vat segmentation for multiple materials (this compares to fixed VCSEL or a linear or rectilinear light source like laser with single galvo or projection system).

Figure 27:
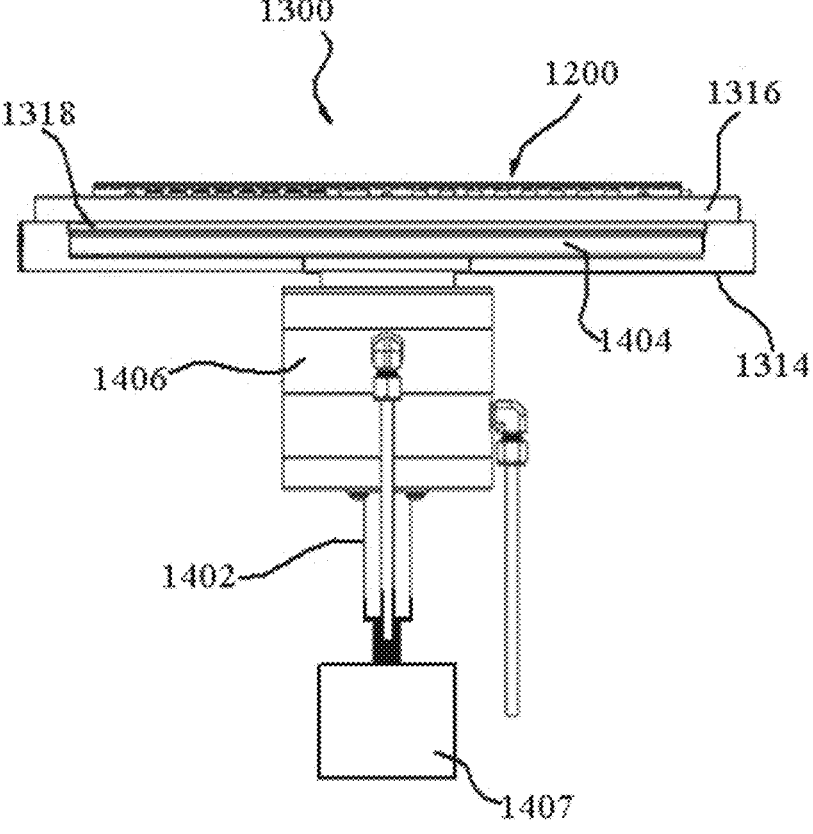
FIG. 27 shows a side view of the rotatable print head platform structure of FIG. 26.

FIG. 27 shows a side profile view of the rotatable print head platform structure 1300 of FIG. 27, which can comprise the print head 1200, the fixed base 1314, the rotation motor 1316, the rotary table 1318, a multichannel slip ring 1402, and a rotation bearing 1404. As can be seen in FIG. 27, The rotation motor 1316, is configured to impart rotary motion to the rotary table 1318 relative to the fixed based 1314. The rotary table #1318 is rotatably affixed to fixed base 1314 through the rotation bearing 1404. Power and signals are transferred to rotatable print head platform structure 1300 through the multichannel slip 1402.

In some embodiments rotatable print head platform structure 1300 further comprises a fluid delivery system for liquid cooling of the thermal conduction modules of the print head 1200, in which a cooling fluid, for example, water or any known cooling fluid, is conducted through a rotational fluid coupling 1406, for example, from a fluid cooling reservoir 1407. In some embodiments, such as the embodiment shown in FIG. 27, the heat sinking system utilized is not only a TEC, but is instead a hybrid thermoelectric/fluid cooling system. In this hybrid system, the heat produced by a VCSEL array is spread out via its heat spreader submount to the cold side of a TEC module heat pump. Geometry of the VCSEL heat spreader submount can be optimized using FEA techniques to ensure optimal heat throughput and even temperature profiles. One or more thermoelectrically-cooled submount modules are positioned with their hot sides on a larger water-cooled base block according to optical and electronic design considerations. Rotational fluid coupling allows for the liquid cooling of the print head while it rotates. Cooling fluid can be pumped into the outer portion of the print head 1200 to allow for the coldest fluid to be introduced to the outer emitters, which will be generating more heat then the inner emitters.

Many different VCSEL array configurations are possible incorporating features of the present invention, both integrated into and separate from, a print head. FIG. shows a light engine 1500, featuring an 8-zone light engine structure. The light engine 1500 comprises arms 1502 (8 shown), upon which VCSEL arrays 1504 are arranged. The light engine 1500 can be configured with the same cooling features and/or the rotational features as the print head 1200 described above.

Figure 29:
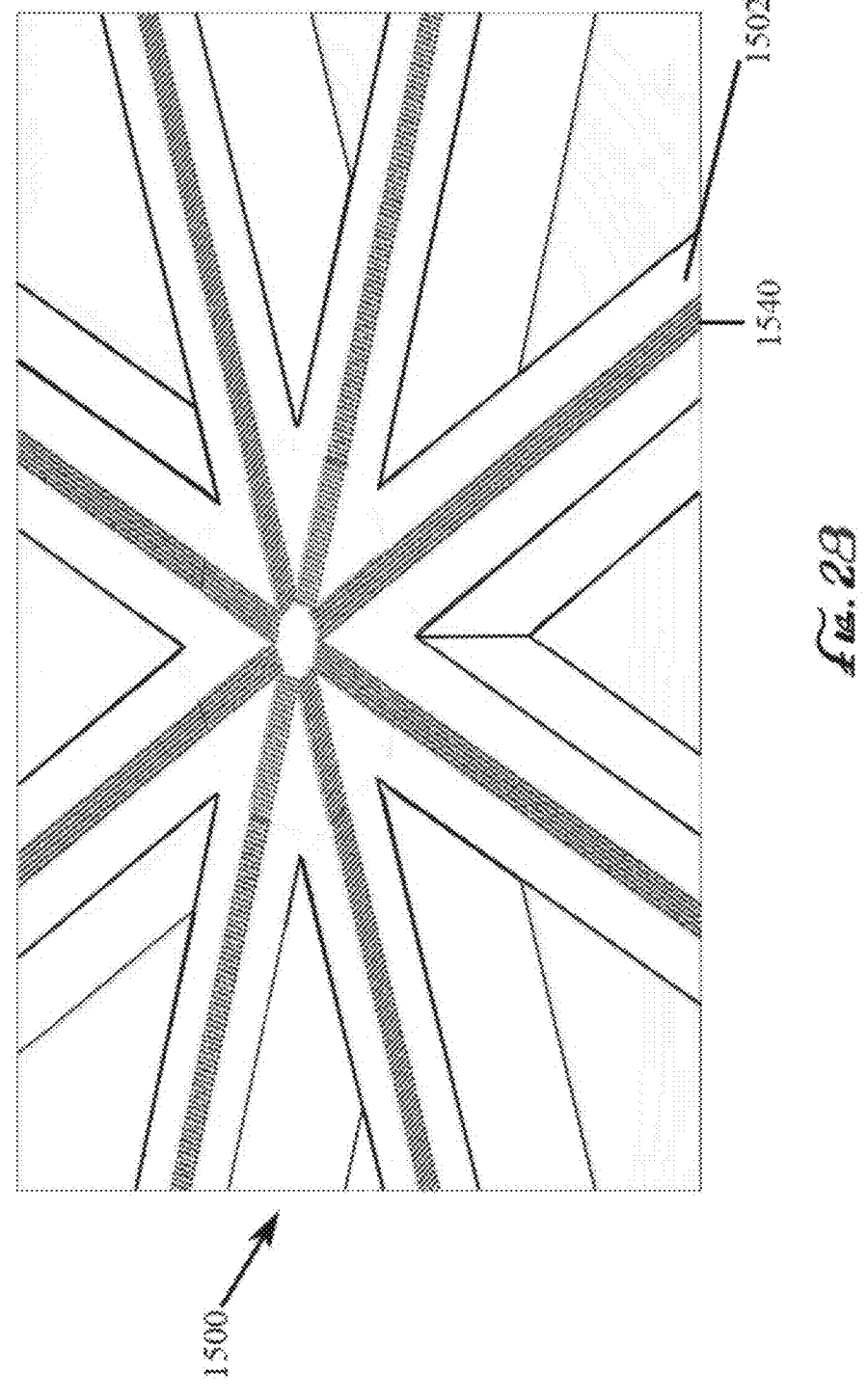
FIG. 29 shows a schematic diagram of an example operational configuration for a VCSEL light source printing system incorporating features of the present invention.
Figure 29:
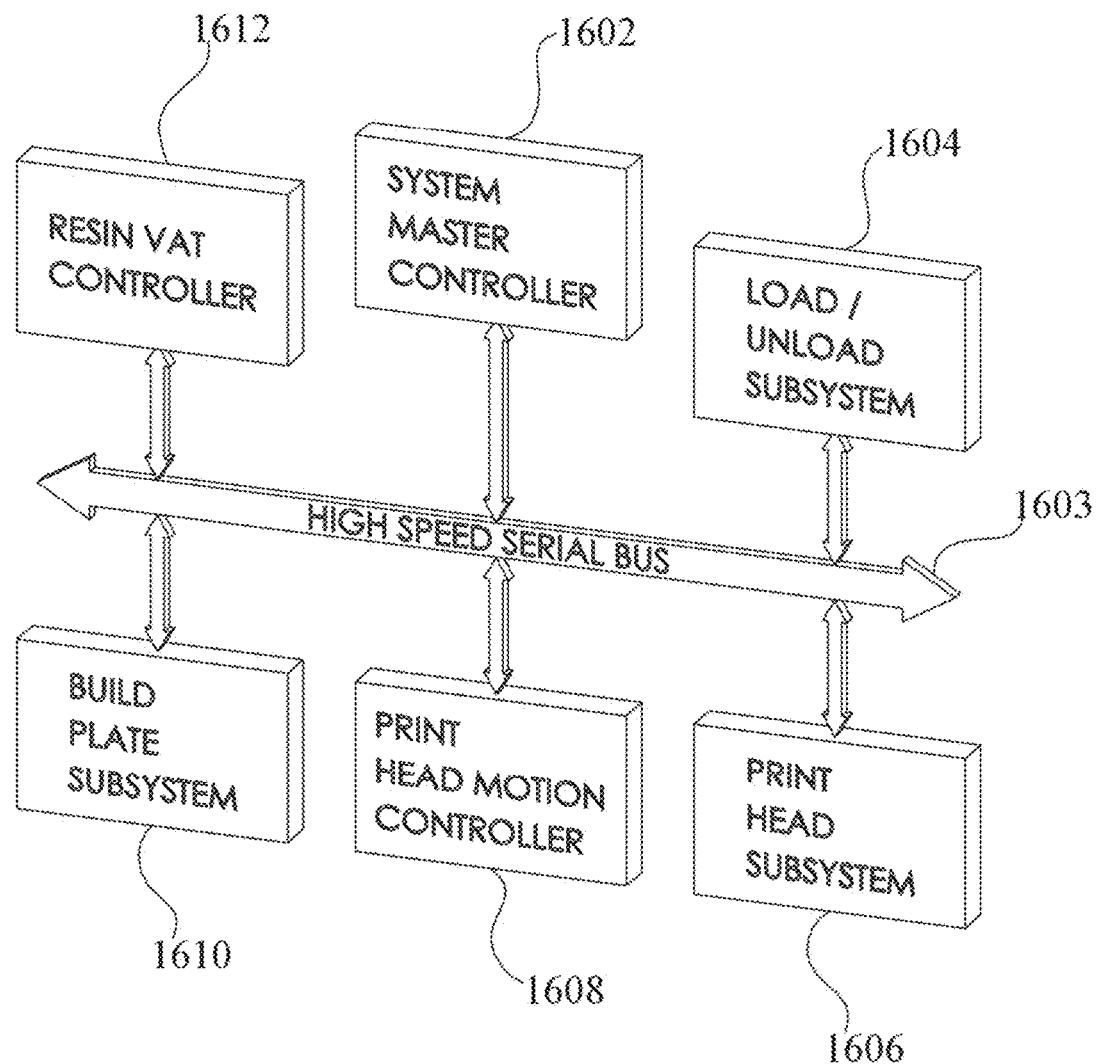

Various overall operational control schemes can be utilized with embodiments of VCSEL light sources incorporating features of the present invention. FIG. 29 shows an example operational configuration 1600, wherein a system master controller 1602, for example, a computing device such as a memory in communication with a processor, is configured to send commands to various subsystems and controllers and to receive user and machine inputs and deliver print specific data to print head subsystem. In some embodiments, the system master controller 1602 is communicatively coupled to the other subsystems and controllers via a high speed serial bus 1603. A load/unload subsystem 1604 is configured to handle loading and unloading of the build plate to and from the machine.

A print head subsystem 1606 is configured to receives print-related data from system master controller, process this information to produce individual emitter pulses, to sense thermal condition of the array and feed info back to print head micro controller or system master controller. This information is processed and used to regulate array temp. The print head subsystem 1606 is configured to receive print data from system master controller, store print data in local memory, and send data to VCSEL drivers (where the VCSEL drivers covert this data into pulse commands for the individually addressable emitters which solidifies materials associated with desired 3d object). The print head subsystem 1606 also utilizes thermal sensors and relays information to print head driver FPGA and on to printhead subsystem microcontroller. This information can be processed at a microcontroller or passed to system master controller to regulate print head operations. Regulation is achieved through the adjustment of voltages of the TAC coolers by the TAC cooler controllers, which receive the adjustment commands from the FPGA, print head microcontroller or system maters controller. In some embodiments, a secondary controller, similar to secondary controller 1308, such as a Flex Ray® controller, sends and receives information to and from the system master controller.

A print head motion controller 1608 is configured to receive print level data for controlling the rotatory and linear advancement of the build plate, receive information from position sensors to monitor build plate theta and z-access distance, and to receive torque data. A build plate subsystem 1610 is configured to provide control to the build plate. A resin vat controller 1612 is configured to control and monitor the print-materials storage portions of the device.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

The foregoing is intended to cover all modifications and alternative constructions falling within the spirit and scope of the invention as expressed in the appended claims, wherein no portion of the disclosure is intended, expressly or implicitly, to be dedicated to the public domain if not set forth in any claims.

We claim:

1. A method of forming a three-dimensional object, comprising:
   providing
      a build platform,
      an optically transparent rigid member,
      a transparent low adhesion substrate having a construction surface, and
      a build region between said build platform and said construction surface;
   filling at least a portion of said build region with a flowable, solidifiable build material;
   irradiating said build region through said optically transparent rigid member and low adhesion substrate to solidify said build material while advancing said build platform away from said construction surface to form said three-dimensional object from said build material, wherein said build platform and said construction surface have a substantially perpendicular central axis, said build platform and said construction surface rotating about said central axis.

2. A method of forming a three-dimensional object, comprising:
   providing a build platform being spaced apart from a construction area, the construction area having
      an optically transparent rigid member,
      a transparent substrate having a construction surface, and one or more material movers positioned to deliver and/or spread one or more flowable build materials in one or more channels formed in or on the transparent substrate, and
      a build region between said build platform and said construction surface;
   filling at least a portion of said build region with the one or more build materials;
   irradiating said build region through said optically transparent rigid member and at least a portion of the transparent substrate to solidify the one or more build materials while continuously or semicontinuously rotating said build platform and said transparent substrate having the construction surface to advance the one or more build materials across said optically transparent rigid member through an exposure zone while also continuously or semicontinuously advancing said build platform away from said construction surface to form said three-dimensional object from said solidified one or more build materials on said build platform, wherein said build platform and said construction surface together define a substantially perpendicular central axis, said build platform and said transparent substrate having the construction surface rotating about said central axis.

3. The method of claim 2, wherein said one or more channels of said construction surface is a plurality of channels formed therein, and wherein the same or different one or more build materials are passed or forced through different ones of said plurality of channels.

4. A method of forming a three-dimensional object, comprising:

providing a build platform;

a construction area having (i) one or more cure zones along an optically transparent rigid member; and (ii) a transparent substrate having a construction surface with at least one material channel formed therein;

one or more material movers selected from the group consisting of at least one material dispenser and at least one material spreader for delivering at least one flowable, solidifiable build material about said at least one material channel; and a build region between said build platform and said construction surface;

feeding said at least one flowable build material to at least a portion of said build region;

irradiating said build region with one or more solidification mechanisms through the construction area and said transparent substrate to solidify the at least one flowable build material within an exposure zone;

continuously or semicontinuously rotating said rigid member and said one or more material movers relative to said build platform and said transparent substrate having a build construction surface, while concurrently or semi-concurrently advancing said build platform away from said construction surface of the transparent substrate to form said three-dimensional object from said solidified build material on said build platform, wherein said build platform and said construction area together defining a substantially perpendicular central axis, and both of, said one or more material movers and said transparent rigid member rotating around or about said central axis.

5. The method of claim 4, wherein said central axis is stationary.

6. The method of claim 4, wherein said central axis moves within the construction area.

7. The method of claim 1, wherein advancing said build platform to form subsequent layers to occurs during the formation of a previous formed layer.

8. The method of claim 1, wherein advancing said build platform to form subsequent layers occurs after the formation of a previously formed layer.

9. The method of claim 1, wherein a subsequent layer is formed after multiple rotations around the central axis.

10. The method of claim 1, where a layer is formed in less than one complete rotation around the central axis.

11. The method of claim 1, wherein the flowable, solidifiable build material is a polymerizable liquid, a composite, or a paste.

12. The method of claim 1, wherein said construction surface has at least one channel formed on or therein such that filling at least a portion of said build region is carried out by passing or forcing said build material into said build region through or along said at least one channel.

13. The method of claim 1, wherein during rotation of build platform and said construction surface of said transparent substrate, the transparent rigid member is non-rotating.

14. The method of claim 1, further comprising a primary material mover and a secondary material mover for filling at least a portion of said build region, wherein the at least one build material includes a flowable solidifiable build material dispensed by said primary material mover and a secondary flowable material dispensed by said secondary material mover.

15. The method of claim 14, wherein the secondary flowable material comprises one or more of:

(i) additives, (ii) coloring agents, or (iii) a release agent configured to affect the solidification of the flowable build material, wherein the release material, when dispensed onto at least a portion of the construction surface of the transparent substrate, forms a release layer effective to prevent or retard solidification bonding of a subsequent layer of the flowable solidifiable build material to that portion of the construction surface.

16. The method of claim 14, wherein the secondary flowable material is dispensed in a controlled manner onto or into the flowable build material to selectively induce solidification of the flowable build material.

17. The method of claim 14, wherein the second material dispenser is configured to dispense the secondary flowable material onto or into the flowable build material so as to prevent or retard solidification of the flowable build material.

18. The method of claim 14, wherein the secondary material dispenser is configured to dispense onto or into the flowable build material the secondary flowable material, said secondary flowable material functioning to increase or decrease the capability of the flowable build material to solidify in the presence of a solidifying medium.

19. The method of claim 1, wherein one or more of the material dispensers provide controlled delivery of a secondary material, said secondary material comprising a material delivered onto or into the solidifiable materials to support the solidifiable material for subsequent processing thereof.

20. The method of claim 2, wherein the continuous or semicontinuous rotation of said transparent substrate about and/or across said transparent rigid member separates the solidified one or more build materials along said one or more channels formed in the construction surface of the transparent substrate while being retained on the build platform or previously solidified material.

21. The method of claim 2, wherein the one or more channels is a plurality of channels formed on or therein said construction surface, and wherein the one or more build materials is a plurality of build materials such a first flowable solidifiable build material is passed through or forced dispensed into a first channel and a second flowable solidifiable build material that is different from the first build material is passed through or forced dispensed into a second channel.

22. The method of claim 2, wherein the one or more material movers is selected from the group consisting of at least one material dispenser and at least one material spreader.

23. The method of claim 22, wherein the one or more material movers is at least one material dispenser and at least one material spreader, the at least one material dispenser and the at least one material spreader positioned to deliver the build material about the construction surface of the transparent substrate along the one or more channels.

24. The method of claim 2, wherein the rotation of the transparent substrate having said construction surface creates a feed mechanism for advancing said flowable build materials across the construction surface, which is adjacent to the transparent rigid member through the exposure zone.

25. The method of claim 2, wherein during rotation of build platform and said construction surface of said transparent substrate, the transparent rigid member and the one or more movers are non-rotating.

26. The method of claim 2, wherein said construction area has a plurality of cure zones that include the transparent rigid member and the one or more material movers that form a plurality of channels along the construction surface of the transparent substrate.

27. The method of claim 26, further comprising one or more solidification mechanisms for filling the at least a portion of said build region, wherein the one or more solidification mechanisms is attached to or incorporated with the plurality of cure zones, and rotates with said construction surface of said transparent substrate.

28. The method of claim 27, wherein at least one portion of the construction area between the transparent rigid member is not transparent and blocks radiation from said one or more solidification mechanisms.

29. The method of claim 2, wherein a first material mover of the one or more material movers deposits a first build material of the one or more build materials, wherein a second material mover of the one or more material movers deposits a second build material of the one or more build materials, and wherein the first build material retards adherence of the second build material that is a flowable, solidifiable build material across said construction surface.

30. The method of claim 2, wherein the build platform is configured to rotate multiple 360° turns in relation to the construction area and/or one or more material movers.

31. The method of claim 2, wherein a defined distance between the build platform and the one or more material movers is alternatively increased during or after rotation in a stepwise manner during or after one or more layers of the solidified build material are formed.

32. The method of claim 4, wherein the one or more material movers includes both said at least one material dispenser and said at least one material spreader.

33. The method of claim 4, wherein said one or more material movers and said transparent rigid member both rotate around said central axis.

34. The method of claim 4, wherein said construction surface of said transparent substrate includes at least one channel formed thereon or therein such that feeding at least a portion of said build region is carried out by moving said at least one flowable, solidifiable build material into said build region through or along said at least one channel.

35. The method of claim 4, wherein said flowable build material is a flowable polymerizable liquid.

36. The method of claim 4, wherein and that rotation said transparent rigid member and said one or more material movers creates a feed mechanism for advancing said flowable build materials across the construction surface of the transparent substate.

37. The method of claim 36, wherein during rotation of said transparent rigid member and said one or more material movers, the build platform and construction surface of the transparent substrate are non-rotating.

38. The method of claim 4, wherein the one or more of the material movers includes a secondary mover that provides controlled delivery of a secondary material of the one or more build materials, said secondary material being delivered by a primary mover of the or more movers onto or into a solidifiable material of the one or more build materials to prevent solidification thereof.

39. The method of claim 4, wherein the one or more material movers and/or the material solidification mechanism are configured to rotate in relation to the construction area and/or the build platform.

40. The method of claim 4, wherein a second material mover of the one or more material movers provide controlled delivery of a secondary material of the one or more build material, said secondary material comprising additives, binding agents, pigments, dyes, or coloring agents to a solidifiable material of the one or more build materials prior to solidification.

41. The method of claim 4, wherein a second material mover of the one or more material movers selectively dispenses on or into a dispensed flowable, solidifiable material of the one or more build materials, a secondary material of the one or more build materials to reduce or prevent the solidification of said dispensed flowable, solidifiable material.

42. The method of claim 4, wherein a second material mover of the one or more material movers selectively dispenses on or into a dispensed flowable, solidifiable material of the one or more build materials a secondary material of the one or more build materials being provided by a primary material mover of the one or more material movers to induce or increase the solidification rate of said dispensed flowable, solidifiable material.

* * * * *